US011945641B2

(12) United States Patent
Mohan et al.

(10) Patent No.: US 11,945,641 B2
(45) **Date of Patent: *Apr. 2, 2024**

(54) CONTAINER WITH INSULATING FEATURES

(71) Applicant: Graphic Packaging International, LLC, Atlanta, GA (US)

(72) Inventors: Kosaraju Mohan, Menomonee Falls, WI (US); Kyle Baird, Milwaukee, WI (US); Jozef Milewski, Richfield, WI (US); James Vogt, West Bend, WI (US); Ryan Kaestner, Milwaukee, WI (US); Mark Baldwin, Milwaukee, WI (US); John Best, Downingtown, PA (US); Robert Koupeny, Sussex, WI (US)

(73) Assignee: Graphic Packaging International, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/723,802

(22) Filed: Apr. 19, 2022

(65) Prior Publication Data

US 2022/0234812 A1 Jul. 28, 2022

Related U.S. Application Data

(63) Continuation-in-part of application No. 16/382,270, filed on Apr. 12, 2019, and a continuation-in-part of (Continued)

(51) Int. Cl.

*B65D 81/38* (2006.01)
*B31B 50/62* (2017.01)

(Continued)

(52) U.S. Cl.

CPC .......... *B65D 81/3869* (2013.01); *B31B 50/62* (2017.08); *B65D 3/06* (2013.01);

(Continued)

(58) Field of Classification Search

CPC .. B65D 3/22; B65D 81/3874; B65D 81/3881; B65D 81/3886; B65D 1/265

See application file for complete search history.

(56) References Cited

U.S. PATENT DOCUMENTS

| | | | |
|---|---|---|---|
| 21,955 | A | 11/1858 | Grosholz |
| 1,771,765 | A | 7/1930 | Benson |

(Continued)

FOREIGN PATENT DOCUMENTS

| | | |
|---|---|---|
| CA | 2814820 | 11/2013 |
| DE | 42 2 6313 | 2/1994 |

(Continued)

OTHER PUBLICATIONS

International Search Report and Written Opinion for US/PCT/2019/027117 dated Jul. 29, 2019.

(Continued)

*Primary Examiner* — Shawn M Braden
(74) *Attorney, Agent, or Firm* — Womble Bond Dickinson (US) LLP

(57) ABSTRACT

A container for containing a cold fluid. The container includes a sidewall construct that includes an inner sidewall extending at least partially around an interior of the container, an outer sleeve attached to the inner sidewall, and a cavity defined between the inner sidewall and the outer sleeve. The container also includes a closed bottom defining a bottom of the interior of the container, and insulating features that include the cavity and a plurality of annular bands, each annular band of the plurality of annular bands includes a spacer that extends in the cavity from the inner (Continued)

sidewall to the outer sleeve. Adjacent bands define a respective pocket of a plurality of pockets in the cavity such that the insulating features maintain a desired temperature of the cold fluid.

42 Claims, 19 Drawing Sheets

Related U.S. Application Data application No. 16/382,265, filed on Apr. 12, 2019, now Pat. No. 11,401,100.

(60) Provisional application No. 62/794,131, filed on Jan. 18, 2019, provisional application No. 62/674,834, filed on May 22, 2018, provisional application No. 62/657,246, filed on Apr. 13, 2018.

(51) Int. Cl.
*B65D 3/06* (2006.01)
*B65D 3/14* (2006.01)
*B31B 105/00* (2017.01)
*B31B 110/20* (2017.01)
*B31B 120/40* (2017.01)

(52) U.S. Cl.
CPC ........ *B65D 3/14* (2013.01); *B31B 2105/0022* (2017.08); *B31B 2110/20* (2017.08); *B31B 2120/40* (2017.08)

(56) References Cited

U.S. PATENT DOCUMENTS

| | | | | |
|---|---|---|---|---|
| 2,266,828 | A | 12/1941 | Sykes | |
| 2,675,954 | A | 4/1954 | Vogel | |
| 3,079,027 | A | 2/1963 | Edwards | |
| 3,082,900 | A | 3/1963 | Goodman | |
| 3,169,689 | A | 2/1965 | Schwartz | |
| 3,208,631 | A | 9/1965 | Edwards | |
| 3,456,860 | A | 7/1969 | Janninck | |
| 3,526,316 | A | 9/1970 | Kalogris | |
| 3,580,468 | A | 5/1971 | McDevitt | |
| 3,675,954 | A | 7/1972 | Konig | |
| 4,007,670 | A | 2/1977 | Albano et al. | |
| 4,049,122 | A | 9/1977 | Maxwell | |
| 4,231,476 | A | 11/1980 | Compton et al. | |
| 4,261,501 | A | 4/1981 | Watkins et al. | |
| 4,435,344 | A | 3/1984 | Iioka | |
| 5,145,107 | A | 9/1992 | Silver et al. | |
| 5,205,473 | A | 4/1993 | Coffin, Sr. | |
| 5,226,585 | A | 7/1993 | Varano | |
| 5,326,019 | A | 7/1994 | Wolff | |
| 5,425,497 | A | 6/1995 | Sorensen | |
| 5,460,323 | A | 10/1995 | Titus | |
| 5,469,983 | A | 11/1995 | Yawata | |
| 5,524,817 | A | 6/1996 | Meier et al. | |
| 5,542,599 | A | 8/1996 | Sobol | |
| 5,547,124 | A | 8/1996 | Mueller | |
| 5,628,453 | A | 5/1997 | MacLaughlin | |
| 5,667,135 | A | 9/1997 | Schaefer | |
| 5,685,480 | A | 11/1997 | Choi | |
| 5,697,550 | A | 12/1997 | Varano et al. | |
| 5,713,512 | A | 2/1998 | Barrett | |
| 5,746,372 | A | 5/1998 | Spence | |
| 5,752,653 | A | 5/1998 | Razzaghi | |
| 5,769,311 | A | 6/1998 | Morita et al. | |
| 5,772,111 | A | 6/1998 | Kirsch | |
| 5,775,577 | A | 7/1998 | Titus | |
| 5,794,843 | A | 8/1998 | Sanchez | |
| 5,826,786 | A | 10/1998 | Dickert | |
| 5,839,653 | A | 11/1998 | Zadravetz | |
| 5,842,633 | A | 12/1998 | Nurse | |
| 5,902,669 | A | 5/1999 | Steinhardt et al. | |
| 5,950,917 | A | 9/1999 | Smith | |
| 5,952,068 | A | 9/1999 | Neale | |
| 5,964,400 | A | 10/1999 | Varano et al. | |
| 5,975,336 | A | 11/1999 | Hart | |
| 6,068,182 | A | 5/2000 | Tokunaga | |
| 6,085,970 | A | 7/2000 | Sadlier | |
| 6,109,518 | A | 8/2000 | Mueller et al. | |
| 6,129,653 | A | 10/2000 | Fredricks et al. | |
| 6,152,363 | A | 11/2000 | Rule, Jr. | |
| 6,193,098 | B1 | 2/2001 | Mochizuki et al. | |
| 6,196,454 | B1 | 3/2001 | Sadlier | |
| 6,253,995 | B1 | 7/2001 | Blok et al. | |
| 6,265,040 | B1 | 7/2001 | Neale et al. | |
| 6,422,456 | B1 | 7/2002 | Sadlier | |
| 6,598,786 | B1 | 7/2003 | Guo | |
| 6,663,926 | B1 | 12/2003 | Okushita et al. | |
| 7,100,770 | B2 | 9/2006 | D'Amato | |
| 7,281,649 | B2 | 10/2007 | Pyper, Jr. | |
| 7,717,325 | B2 | 5/2010 | Puls et al. | |
| 8,061,551 | B2 | 11/2011 | Matlovich | |
| 8,146,797 | B2 | 4/2012 | D'Amato | |
| 8,360,263 | B2 | 1/2013 | D'Amato | |
| 8,608,018 | B2 | 12/2013 | Babinsky et al. | |
| 9,102,461 | B2 | 8/2015 | Leser et al. | |
| 9,266,660 | B2 | 2/2016 | Cai | |
| 9,290,312 | B2 | 3/2016 | Brown | |
| 9,648,969 | B2 | 5/2017 | Fu et al. | |
| 9,783,359 | B2 | 10/2017 | D'Amato | |
| 10,398,242 | B2 | 9/2019 | Booney et al. | |
| 2002/0000446 | A1 | 1/2002 | Taylor | |
| 2002/0179617 | A1 | 12/2002 | Barthlow et al. | |
| 2004/0112949 | A1 | 6/2004 | Hed et al. | |
| 2005/0029273 | A1 | 2/2005 | Hechmati | |
| 2005/0184137 | A1 | 8/2005 | Dorsey | |
| 2005/0236468 | A1 | 10/2005 | Sadlier | |
| 2006/0118608 | A1 | 6/2006 | Stahlecker | |
| 2007/0117702 | A1 | 5/2007 | Okushita et al. | |
| 2007/0284426 | A1 | 12/2007 | Lo | |
| 2008/0078824 | A1 | 4/2008 | Spriegel et al. | |
| 2008/0078825 | A1* | 4/2008 | Puls | B65D 81/3869 229/403 |
| 2008/0087715 | A1 | 4/2008 | Robertson et al. | |
| 2008/0121681 | A1* | 5/2008 | Wiedmeyer | B65D 81/3874 220/592.2 |
| 2008/0156857 | A1 | 7/2008 | Johnston | |
| 2009/0321508 | A1 | 12/2009 | Fu et al. | |
| 2010/0025414 | A1 | 2/2010 | Mansour et al. | |
| 2010/0044424 | A1 | 2/2010 | Van Handel | |
| 2010/0108693 | A1 | 5/2010 | Zhang et al. | |
| 2010/0108694 | A1 | 5/2010 | Sedlbauer et al. | |
| 2010/0187296 | A1 | 7/2010 | Puls et al. | |
| 2012/0097685 | A1 | 4/2012 | Babinsky et al. | |
| 2012/0199641 | A1 | 8/2012 | Hsieh | |
| 2012/0261427 | A1 | 10/2012 | Bates | |
| 2012/0285972 | A1* | 11/2012 | Fu | B65D 81/3869 220/592.2 |
| 2012/0318805 | A1 | 12/2012 | Leser | |
| 2013/0001286 | A1* | 1/2013 | Stahlecker | B65D 3/22 493/84 |
| 2013/0001289 | A1 | 1/2013 | Tedford | |
| 2013/0303351 | A1 | 11/2013 | Fu | |
| 2015/0048086 | A1 | 2/2015 | Brown | |
| 2015/0108146 | A1 | 4/2015 | Jameson | |
| 2017/0113831 | A1 | 4/2017 | Aubele et al. | |
| 2017/0326830 | A1 | 11/2017 | Fu et al. | |
| 2017/0340149 | A1 | 11/2017 | Morgan | |
| 2018/0016052 | A1 | 1/2018 | Tomioka | |
| 2018/0263391 | A1 | 9/2018 | Garza et al. | |
| 2018/0370666 | A1 | 12/2018 | Garza et al. | |
| 2023/0249426 | A1* | 8/2023 | Mohan | B65D 81/3869 493/114 |

FOREIGN PATENT DOCUMENTS

| | | |
|---|---|---|
| DE | 198 40 841 | 3/2000 |
| EP | 1 227 042 | 4/2004 |
| EP | 1 227 043 | 6/2004 |
| EP | 1 479 512 A2 | 11/2004 |

(56) References Cited

FOREIGN PATENT DOCUMENTS

| | | | |
|---|---|---|---|
| EP | 1 830 056 | | 9/2007 |
| EP | 1 031 514 | | 10/2007 |
| EP | 2 848 554 | A2 | 3/2015 |
| GB | 1 261 532 | | 1/1972 |
| JP | 8-276927 | | 10/1996 |
| JP | 2000-118521 | | 4/2000 |
| JP | 2000-142834 | | 5/2000 |
| JP | 2000-226022 | | 8/2000 |
| WO | WO 94/03326 | | 2/1994 |
| WO | WO 2017/074510 | A1 | 5/2017 |

OTHER PUBLICATIONS

International Search Report and Written Opinion for US/PCT/2019/027119 dated Jul. 29, 2019.

International Search Report and Written Opinion for US/PCT/2019/027120 dated Jul. 31, 2019.

Supplementary European Search Report for EP 19 78 5215 dated Dec. 6, 2021.

Third-Party Submission Under 37 CFR 1.290 for U.S. Appl. No. 16/382,265 dated Apr. 14, 2020, including Concise Description of Relevance.

Supplementary EP Search Report for EP 19 78 5699 dated Jan. 14, 2022.

Supplementary EP Search Report for EP 19 78 4621 dated Jan. 14, 2022.

Issue Fee Transmittal for U.S. Appl. No. 16/382,265 dated May 16, 2022.

Notice of Allowance and Fee(s) Due for U.S. Appl. No. 16/382,265 dated Feb. 24, 2022.

Amendment A and Response to Office Action for U.S. Appl. No. 16/382,265 dated Dec. 2, 2021.

Office Action for U.S. Appl. No. 16/382,265 dated Sep. 2, 2021.

Response to Restriction Requirement for U.S. Appl. No. 16/382,265 dated May 25, 2021.

Office Action for U.S. Appl. No. 16/382,265 dated May 4, 2021.

Office Action for U.S. Appl. No. 16/382,270 dated Apr. 6, 2022.

Amendment D and Response to Office Action for U.S. Appl. No. 16/382,270 dated Feb. 11, 2022.

Office Action for U.S. Appl. No. 16/382,270 dated Oct. 13, 2021.

Amendment C and Response to Office Action for U.S. Appl. No. 16/382,270 dated Aug. 3, 2021.

Office Action for U.S. Appl. No. 16/382,270 dated May 5, 2021.

Request for Continued Examination (RCE) Transmittal for U.S. Appl. No. 16/382,270 dated Oct. 10, 2020.

Amendment B and Response to Final Office Action for U.S. Appl. No. 16/382,270 dated Oct. 10, 2020.

Office Action for U.S. Appl. No. 16/382,270 dated Jul. 20, 2020.

Amendment A and Response to Office Action for U.S. Appl. No. 16/382,270 dated Mar. 25, 2020.

Office Action for U.S. Appl. No. 16/382,270 dated Jan. 7, 2020.

International Search Report and Written Opinion for PCT/US2023/018900 dated Jul. 26, 2023.

* cited by examiner

CONTAINER WITH INSULATING FEATURES

CROSS-REFERENCE TO RELATED APPLICATIONS

This application is a continuation-in-part of U.S. patent application Ser. No. 16/382,265, filed Apr. 12, 2019, which claims the benefit of each of U.S. Provisional Patent Application No. 62/657,246, filed on Apr. 13, 2018, U.S. Provisional Patent Application No. 62/674,834, filed on May 22, 2018, and U.S. Provisional Patent Application No. 62/794,131, filed on Jan. 18, 2019, and this application is a continuation-in-part of U.S. patent application Ser. No. 16/382,270, filed Apr. 12, 2019 which claims the benefit of each of U.S. Provisional Patent Application No. 62/657,246, filed on Apr. 13, 2018, U.S. Provisional Patent Application No. 62/674,834, filed on May 22, 2018, and U.S. Provisional Patent Application No. 62/794,131, filed on Jan. 18, 2019.

INCORPORATION BY REFERENCE

The disclosures of each of U.S. patent application Ser. No. 16/382,265, filed Apr. 12, 2019, U.S. patent application Ser. No. 16/382,270, filed Apr. 12, 2019, U.S. Provisional Patent Application No. 62/657,246, filed on Apr. 13, 2018, U.S. Provisional Patent Application No. 62/674,834, filed on May 22, 2018, and U.S. Provisional Patent Application No. 62/794,131, filed on Jan. 18, 2019, are hereby incorporated by reference for all purposes as if presented herein in their entirety.

BACKGROUND OF THE DISCLOSURE

The present disclosure generally relates to containers for containing fluid, for example, beverage containers. In one embodiment, the present disclosure relates to a container formed from a sidewall and having insulating features sufficient to maintain a desired temperature of a cool, cold, and/or at least partially frozen beverage, and/or one or more surface conditions of the container.

SUMMARY OF THE DISCLOSURE

According to one aspect of the disclosure, a container for containing a cold fluid comprises a sidewall construct comprising an inner sidewall extending at least partially around an interior of the container, an outer sleeve attached to the inner sidewall, and a cavity defined between the inner sidewall and the outer sleeve. The container further comprises a closed bottom defining a bottom of the interior of the container. The container further comprises insulating features comprising the cavity and a plurality of annular bands, each annular band of the plurality of annular bands comprises a spacer that extends in the cavity from the inner sidewall to the outer sleeve. Adjacent bands define a respective pocket of a plurality of pockets in the cavity such that the insulating features maintain a desired temperature of the cold fluid.

According to another aspect of the disclosure, a sidewall construct for forming a fluid container for containing a cold fluid comprises an inner sidewall extending at least partially around an interior of the container, an outer sleeve attached to the inner sidewall, a cavity defined between the inner sidewall and the outer sleeve, and insulating features comprising the cavity and a plurality of annular bands. Each band of the plurality of annular bands comprises a spacer that extends in the cavity from the inner sidewall to the outer sleeve, and adjacent bands define a respective pocket of a plurality of pockets in the cavity for maintaining a desired temperature of the cold fluid.

According to another aspect of the disclosure, a method of forming a container for containing a cold fluid comprises obtaining an inner sidewall and an outer sleeve, and attaching the outer sleeve to the inner sidewall to form a sidewall construct with a cavity defined between the inner sidewall and the outer sleeve. The attaching comprises forming insulating features in the sidewall construct, the insulating features comprise the cavity and a plurality of annular bands, each annular band of the plurality of annular bands comprises a spacer that extends in the cavity from the inner sidewall to the outer sleeve, adjacent bands define a respective pocket of a plurality of pockets in the cavity for maintaining a desired temperature of the cold fluid. The method further comprises forming an interior of the container by positioning the sidewall construct so that the inner sidewall extends at least partially around the interior. The method further comprises positioning a closed bottom relative to the sidewall construct.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

Containers according to the present disclosure can accommodate fluids, e.g., liquid or semi-liquid beverages that can include one or more solid components, of different sizes and compositions. For the purpose of illustration and not for the purpose of limiting the scope of the disclosure, the following detailed description describes a container for cool, cold, and/or at least partially frozen beverages, e.g., iced coffee, cold brew coffee, blended ice beverages (such as smoothies, slush beverages, milkshakes, etc.), iced tea, lemonade, and other flavored or unflavored beverages, to name a few. It will be understood that the containers described herein can hold different types of beverages and/or products containing one or more food items without departing from the disclosure.

In this specification, the terms "lower," "bottom," "upper," and "top" indicate orientations determined in relation to fully erected and upright containers. As described herein, containers can be formed from blanks by overlapping multiple portions, panels, and/or end flaps. Such portions, panels, and/or end flaps may be designated herein in terms relative to one another, e.g., "first", "second", "third", etc., in sequential or non-sequential reference, without departing from the disclosure.

Figure 1:
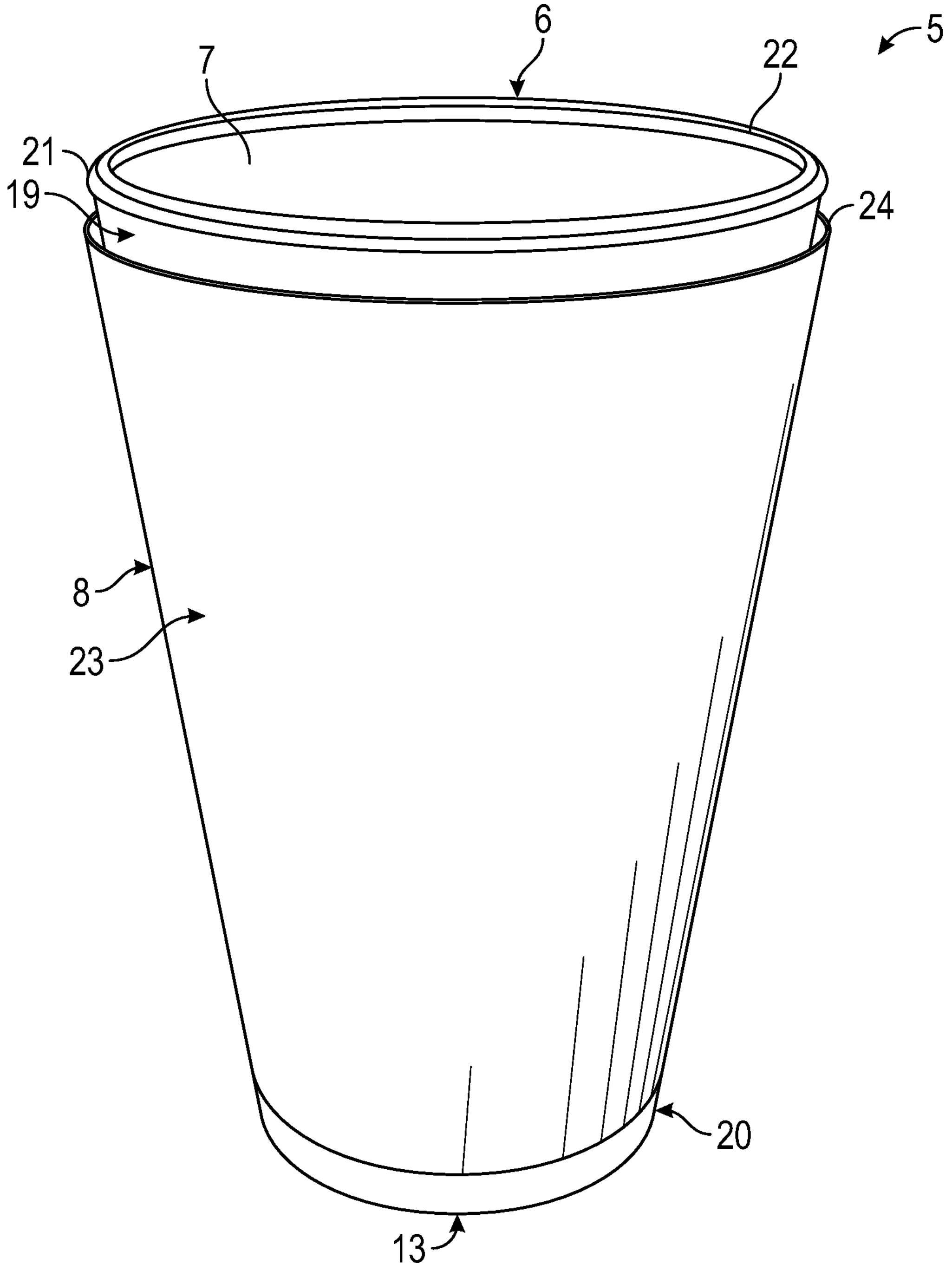
FIG. 1 is a perspective view of a container according to a first exemplary embodiment of the disclosure.
Figure 2:
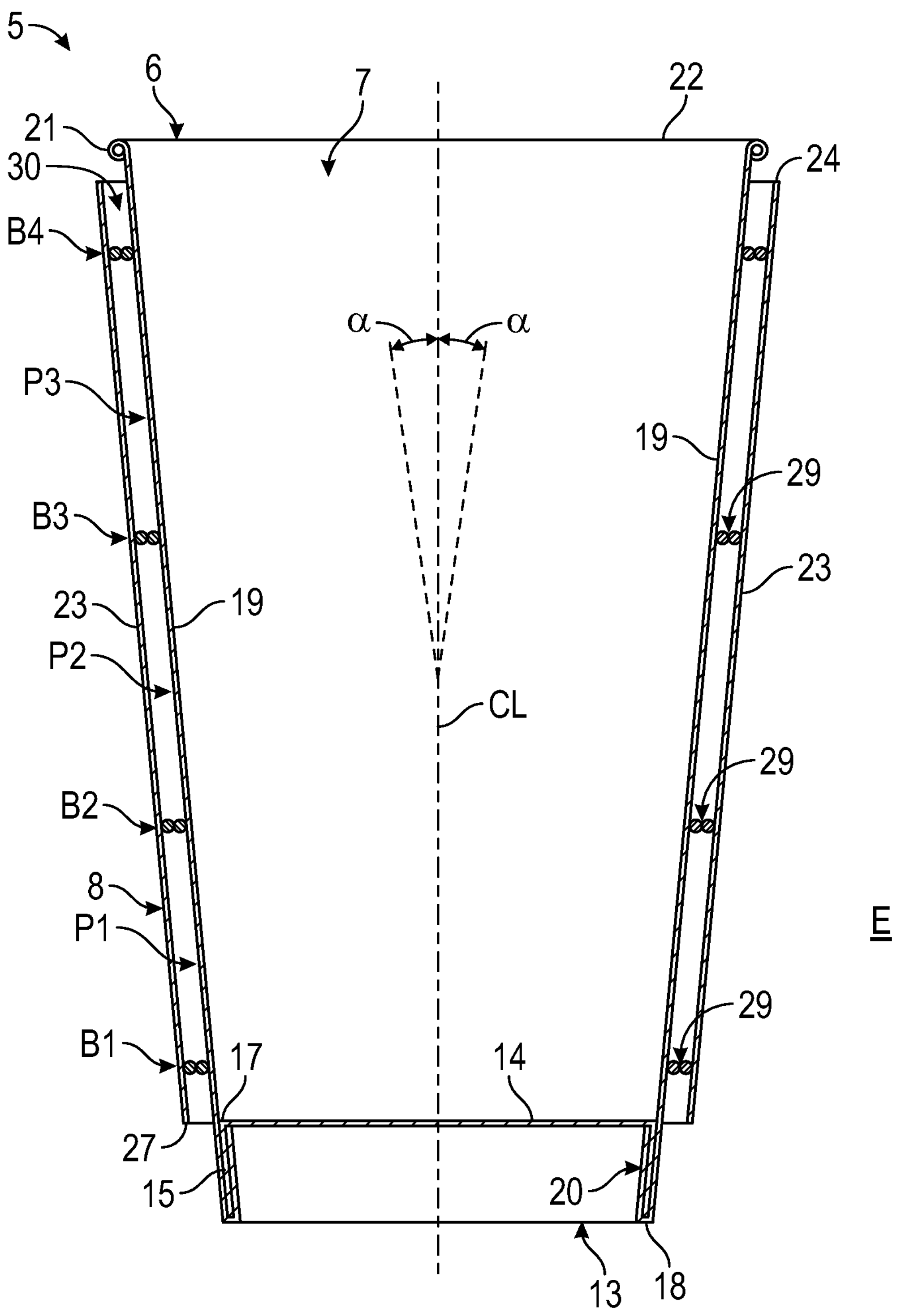
FIG. 2 is a schematic cross-sectional view of the container of FIG. 1.

FIG. 1 is a perspective view, and FIG. 2 is a cross-sectional view, of a container 5 according to a first exemplary embodiment of the disclosure. In one embodiment, the container 5 is a cup having the general shape of a truncated cone with an open top 6, a closed bottom 13, and a sidewall construct 8 extending from a bottom edge to a top edge of the container 5. The closed bottom 13 and sidewall construct 8 define and extend at least partially around an interior space 7 (FIG. 2) of the container 5 with an interior volume that is for holding fluid such as a cool, cold, or at least partially frozen beverage.

In the illustrated embodiment, the sidewall construct 8 comprises an annular inner sidewall 19 (broadly, "inner wall") and an outer sleeve 23 (broadly, "outer wall") attached to the inner sidewall 19 such that the sidewall construct 8 can be referred to as a double wall structure. In one embodiment, one or both of the inner sidewall 19 and the sleeve 23 can be formed of paperboard, having one or more surface provided with, for example, a thermoplastic coating. Such paperboard can be provided with one or more desired surface features, for example, ribs or ridges, such as in fluted or corrugated paperboard. In one embodiment, the inner sidewall 19 can have a thickness of at least about 12 mil and the sleeve 23 can have a thickness of at least about 1 mil.

Figure 3:
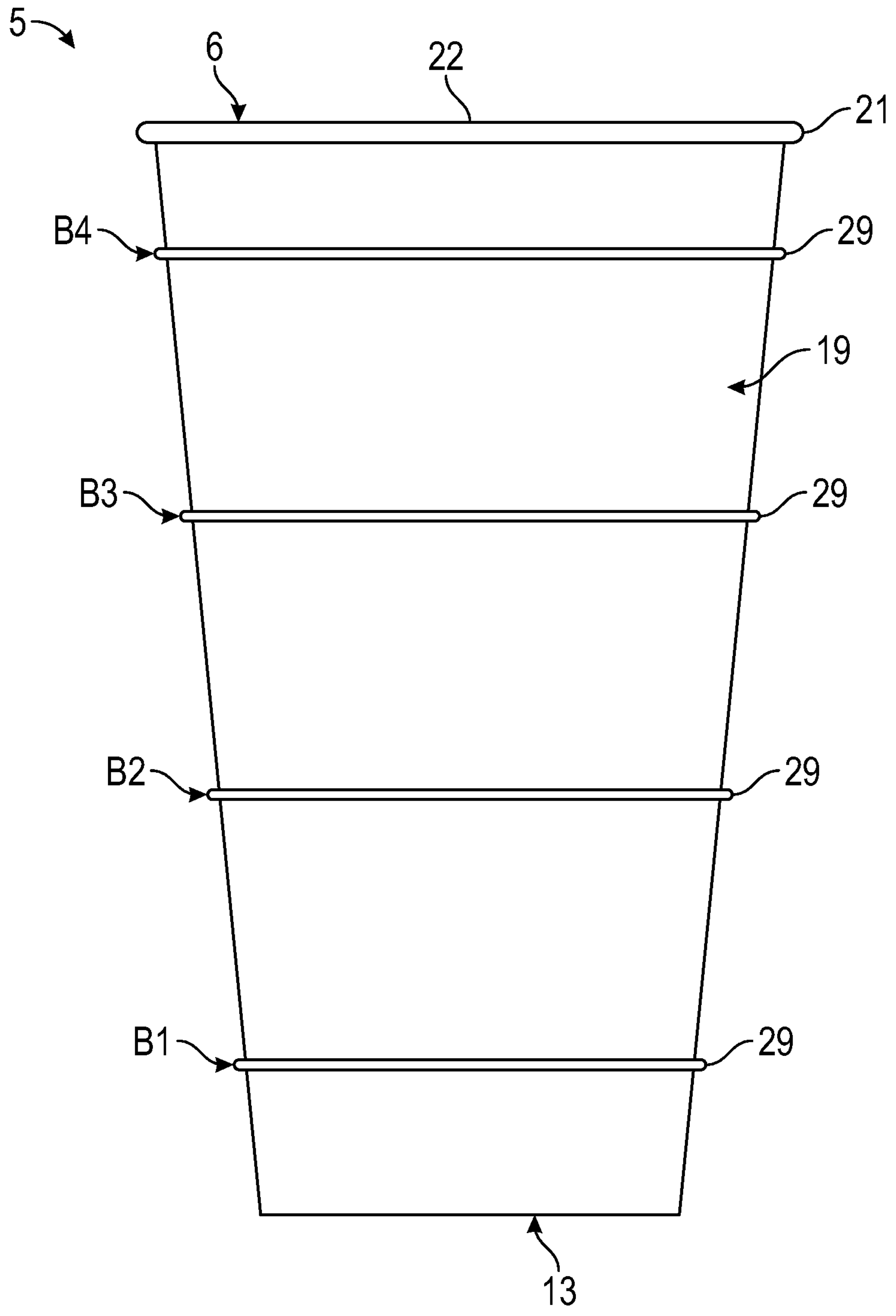
FIG. 3 is a front view of the container of FIG. 1 with an outer sleeve removed.
Figure 4:
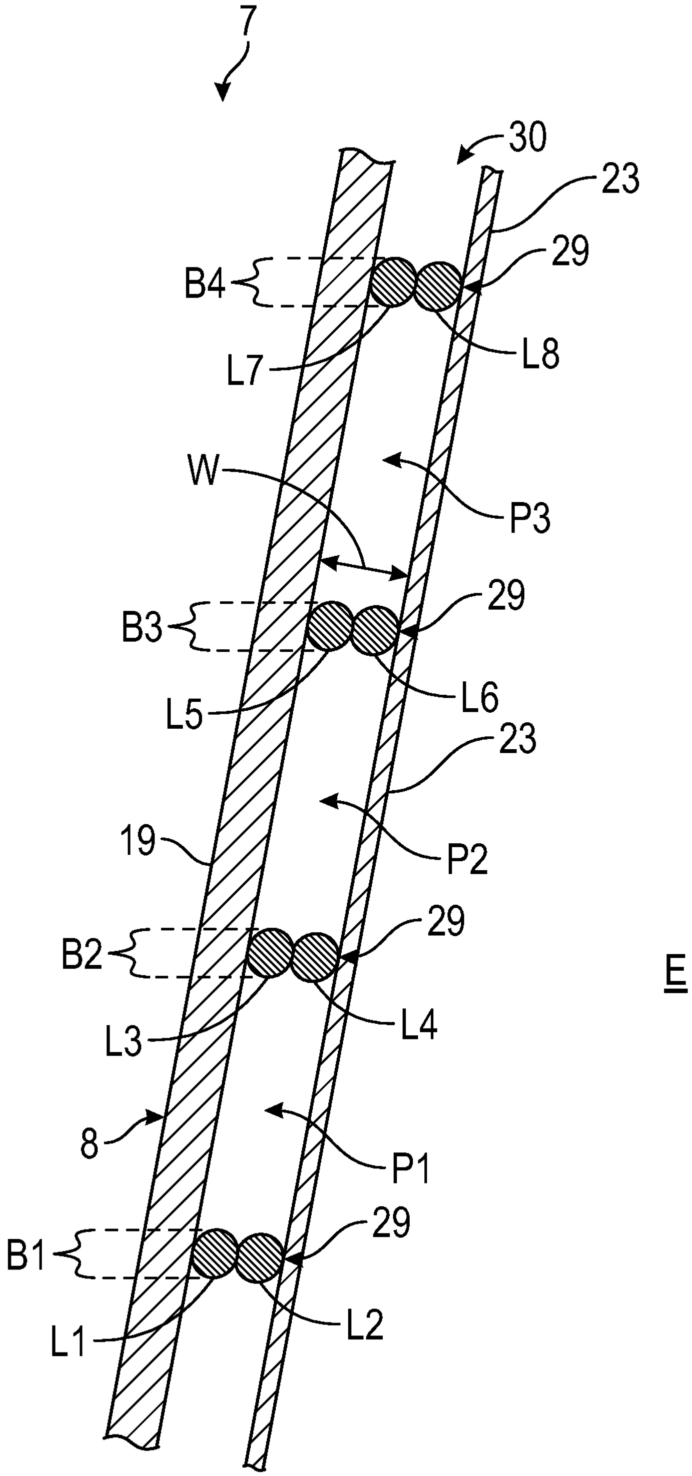
FIG. 4 is a schematic cross-sectional view of a portion of a sidewall construct of the container of FIG. 1.

With additional reference to FIGS. 3 and 4, the container 5 includes insulating features in the sidewall construct 8 that include bands B1, B2, B3, B4 of spacers 29 that are circumferentially disposed at different vertical heights along the sidewall construct 8. The spacers 29 can be at least partially comprised of adhesive, such as a hot melt glue or other glue, and extend from the inner sidewall 19 to the outer sleeve 23 to adhesively attach the outer sleeve 23 to the inner sidewall 19. In one embodiment, the spacers 29 can be formed from a different polymeric material. In this regard, in one embodiment, the adhesive that forms the spacers 29 can be set or cured to provide desired properties of the spacers 29. As discussed further below, the insulating features of the container 5 are arranged so that an insulation profile of the container 5 can be enhanced, for example, so that a selected or desired temperature or temperature range of the fluid in the container 5 is maintained, e.g., such that a rate of temperature increase toward an equilibrium temperature is within a selected or desired threshold, and/or so that one or more outer surface conditions of the container 5 can be maintained.

In one embodiment, the insulating features of the container 5 are arranged such that a relatively low temperature, e.g., a temperature at or below about approximately 40° F. (or any suitable temperature for a cold beverage) of a cool, cold, and/or at least partially frozen fluid in the interior space 7 of the container 5 can be maintained, and such that the transfer of heat to the cool, cold, and/or at least partially frozen fluid in the interior space 7 from a surrounding environment E and/or a customer's hands can be substantially minimized, inhibited, and/or prevented. The insulating features of the container 5 additionally can maintain one or more surface conditions of the exterior surface of the sleeve 23 and/or exposed portions of the inner sidewall 19, for example, a surface temperature above the dew point of the surrounding environment such that condensation is minimized, inhibited, and/or prevented from forming on the container 5. In one embodiment, such condition can be maintained for up to and including about an hour or more. In this regard, a user can be provided with a more comfortable surface to grasp the container 5, e.g., such that the exterior surface of the outer sleeve 23 does not present or minimizes any cold temperature regions or zones that are uncomfortable to a customer's touch and/or a wet or slippery texture due to condensation. The container 5 can be provided with a different arrangement of insulating features without departing from the disclosure.

As shown, the bottom 13 of the container 5 includes a generally circular bottom panel 14 and an annular leg 15 downwardly-depending from the bottom panel 14 at a generally circular line of weakening 17. The bottom panel 14 has a diameter that generally corresponds to a horizontal distance between opposing sides of the inner sidewall 19. The inner sidewall 19 extends upwardly from the closed bottom 13 to define the interior space 7 of the container 5. The annular leg 15 is adhesively attached to a lower edge margin 20 of the inner sidewall 19 to secure the bottom 13 to the sidewall construct 8 and to form the bottom of the interior space 7 of the container 5. As shown, the lower edge margin 20 of the inner sidewall 19 extends along the outer surface of the annular leg 15, wraps under a lower edge thereof, and extends upwardly along the interior surface of the annular leg 15 toward the bottom panel 14. The lower edge margin 20 of the inner sidewall 19 can be an at least partially flexible portion of the inner sidewall 19 configured to engage the annular leg 15, and can include surface features to facilitate such engagement, for example, an adhesive treatment and/or frictionally-enhancing patterning. As described herein, the portion of the lower edge margin 20 of the inner sidewall 19 overlying the lower edge of the annular leg 15 will define an inner bottom edge or inner lower edge 18 of the inner sidewall 19. In one embodiment, the lower edge of the annular leg 15 can define the lower edge of the coupled inner sidewall 19 and the bottom 13.

The bottom 13 can be secured to the sidewall construct 8 in a different configuration without departing from the disclosure. For example, in one embodiment, the bottom 13 can be inserted into the interior space 7 formed by the sidewall construct 8 and coupled thereto, e.g., in the manner described above. In another embodiment, the bottom 13 and the annular leg 15 of the container 5 can be integrally formed with the inner sidewall 19 or can be otherwise attached to a portion of the inner sidewall 19 by other attachment means. In still another embodiment, the bottom 13 can be coupled to the inner sidewall 19 as described above, and the coupled inner sidewall 19/bottom 13 can be inserted into or otherwise coupled with the sleeve 23, e.g., via the spacers 29. In yet another embodiment, the sidewall construct 8 can be formed in a flat configuration, and then wrapped around and coupled to the bottom 13 in the manner described above.

As also shown, a top edge of the inner sidewall 19 is curved, curled, or otherwise flanged to define a top or upper rim 21 of the container 5 that circumscribes an opening 22 in communication with the interior space 7 of the container 5. The rim 21 and/or an upper portion of the container 5 can be configured to engage a lid or other top closure structure.

The illustrated configuration of the truncated conical shape of the container 5 can be achieved by forming the inner sidewall 19 from a flat blank by folding around a mandrel such that an overlapping seam is provided. The inner sidewall 19 (and the sleeve 23 disposed therearound), as shown, have a tapered configuration such that the inner sidewall 19 and the sleeve 23 extend at a constant angle α relative to a vertical centerline CL of the container 5.

Still referring to FIGS. 1-4, the outer sleeve or sleeve 23, e.g., a wrap or other layer, is disposed in at least partial circumferential engagement with the inner sidewall 19 such that the sleeve 23 presents an outer surface of the container 5 for engagement by a user. As shown, the sleeve 23 includes an upper edge 24 proximate the rim 21 and the sleeve 23 protrudes downwardly such that an outer bottom edge or outer lower edge 27 of the sleeve 23 is spaced above the lower edge 18 of the inner sidewall 19. In one embodiment, the lower edge 27 of the sleeve 23 is spaced above the lower edge 18 of the inner sidewall 19 by approximately the vertical length of the lower edge margin 20 such that the lower edge 27 of the sleeve 23 is substantially level with the bottom panel 14 of the bottom 13 of the container 5. In one embodiment, the lower edge 27 of the sleeve 23 can be approximately level with the lower edge 18 of the inner sidewall 19.

As described herein, at least the interface between the sleeve 23 and the inner sidewall 19 of the container 5 forms insulating features of the container 5 that include a cavity 30 defined between the inner wall 19 and the outer sleeve 23. In one embodiment, the insulating features of the container 5 can also include one or more portions of the inner sidewall 19 and/or the sleeve 23. Alternative insulating features are further described in U.S. Provisional Patent Application No. 62/657,246, filed on Apr. 13, 2018, and U.S. Provisional Patent Application No. 62/674,834, filed on May 22, 2018, the entire contents of each of which are incorporated by reference herein.

FIG. 3 is a front view of the container 5 with the sleeve 23 removed such that the inner sidewall 19 is visible. As shown, a plurality of annular bands B1, B2, B3, B4 of adhesive are applied between the inner sidewall 19 and the outer sleeve 23 to attach the outer sleeve 23 to the inner sidewall 19 and to form the spacers 29. In one embodiment, the annular bands B1, B2, B3, B4 are each a continuous pattern of adhesive to form respective continuous spacers 29. As shown in FIG. 4, the bands B1, B2, B3, B4 can each be comprised of two respective layers of adhesive L1, L2, L3, L4 and L5, L6, L7, L8 to form the spacers 29. As described above, the adhesive that forms the spacers 29 can be set or cured to provide desired properties of the spacers 29. In one embodiment, a respective first layer L1, L2, L3, L4 of adhesive can be applied to the outer surface of the sidewall construct 8 or to the interior surface of the sleeve 23, allowed to at least partially set or cure, and a respective second layer L5, L6, L7, L8 of adhesive can be applied thereon. In another embodiment, a single layer of adhesive can be applied at a desired thickness to form one or more of the bands B1, B2, B3, B4.

As described further below, one or more of the bands B1, B2, B3, B4 can be a continuous band of adhesive arranged between the inner sidewall 19 and the outer sleeve 23 such that an at least partial seal is provided, e.g., to minimize, inhibit, and/or prevent the passage of fluid thereby. In one embodiment, one or more of the bands B1 through B4 can have one or more discontinuities therealong, for example, to provide ventilation paths among the bands B1, B2, B3, B4 and/or an external environment E. It will be understood that a different numbers of bands of spacers 29 can be present without departing from the disclosure. In one embodiment, surface features such as bands, ridges, protrusions, etc., can be provided in at least partial circumferential engagement around the inner sidewall 19, and can provide a surface or substrate upon which the bands of adhesive that form the spacers 29 can applied. Such surface features can provide an optimal surface for the adhesive interface between the inner sidewall 19 and the sleeve 23.

As shown in FIGS. 2 and 4, a pocket P1 is defined in the cavity 30 between the inner sidewall 19 and the sleeve 23 between the band B1 and the band B2, a pocket P2 is defined in the cavity 30 between the inner sidewall 19 and the sleeve 23 between the band B2 and the band B3, and a pocket P3 is defined in the cavity 30 between the inner sidewall 19 and the sleeve 23 between the band B3 and the band B4. At least the pockets P1, P2, P3 provide insulating spaces or gaps between the inner sidewall 19 and the sleeve 23. As described, one or more of the pockets P1, P2, P3 can be a region in which fluid is at least partially held or sealed by the arrangement of the inner sidewall 19, the outer sleeve 23, and the respective bands B1, B2, B3, B4. In one embodiment, each pocket P1, P2, P3 can have a width W measured from the inner sidewall 19 to the outer sleeve 23 and at least partially determined by the size of the spacers 29, for example, between about 60 mils and about 120 mils, for example, about 60 mils, about 70 mils, about 80 mils, about 90 mils, about 100 mils, about 110 mils, about 120 mils, etc. or integer or non-integer numbers therebetween. In one embodiment, the width W can be about 80 mils. It will be understood the width W of the spacers 29 can be a different dimension without departing from the disclosure. The width W of the spacers 29 defines the relative spacing of the cavity 30 such that the pockets P1, P2, P3 can be configured as air gaps between the interior space 7 of the container 5 and an external environment E.

Such insulating features can resist a temperature change of fluid in the container 5 by resisting the transfer of heat from the external environment E surrounding the container 5 to the cavity 30, and further to a fluid in the interior space 7 of the container 5. In one embodiment, heat from the surrounding environment E can be at least partially transferred to air or other fluid that is trapped or otherwise maintained in one or more of the pockets P1, P2, P3 between the respective bands B1, B2, B3, B4 of spacers 29. The pockets P1, P2, P3 thus provide an additional buffer, e.g., a heat sink, between the interior space 7 of the container 5 and the surrounding environment E, in addition to the inner sidewall 19 and the outer sleeve 23. In addition to maintaining a temperature of a fluid in the interior space 7 of the container 5, such insulation provided by the arrangement of the spacers 29 can also maintain a desired surface temperature of the sleeve 23 to facilitate comfortable grasping by a customer and/or maintain one or more desired surface conditions of the sleeve 23, e.g., to minimize, inhibit, and/or prevent condensation as described above. Further still, the arrangement of the bands B1, B2, B3, B4 of spacers 29 can impart desired structural properties to the container 5, for example, by providing a desired pattern of rigidity such that an optimal pattern of flexion is provided to the container 5 during use. For example, upon grasping of the sidewall construct 8 by a customer, portions of the sleeve 23/inner sidewall 19 can bend or flex inwardly into one or more of the pockets P1, P2, P3 to provide a textured or irregular surface configuration to enhance the customer's grip on the container 5.

Figure 5:
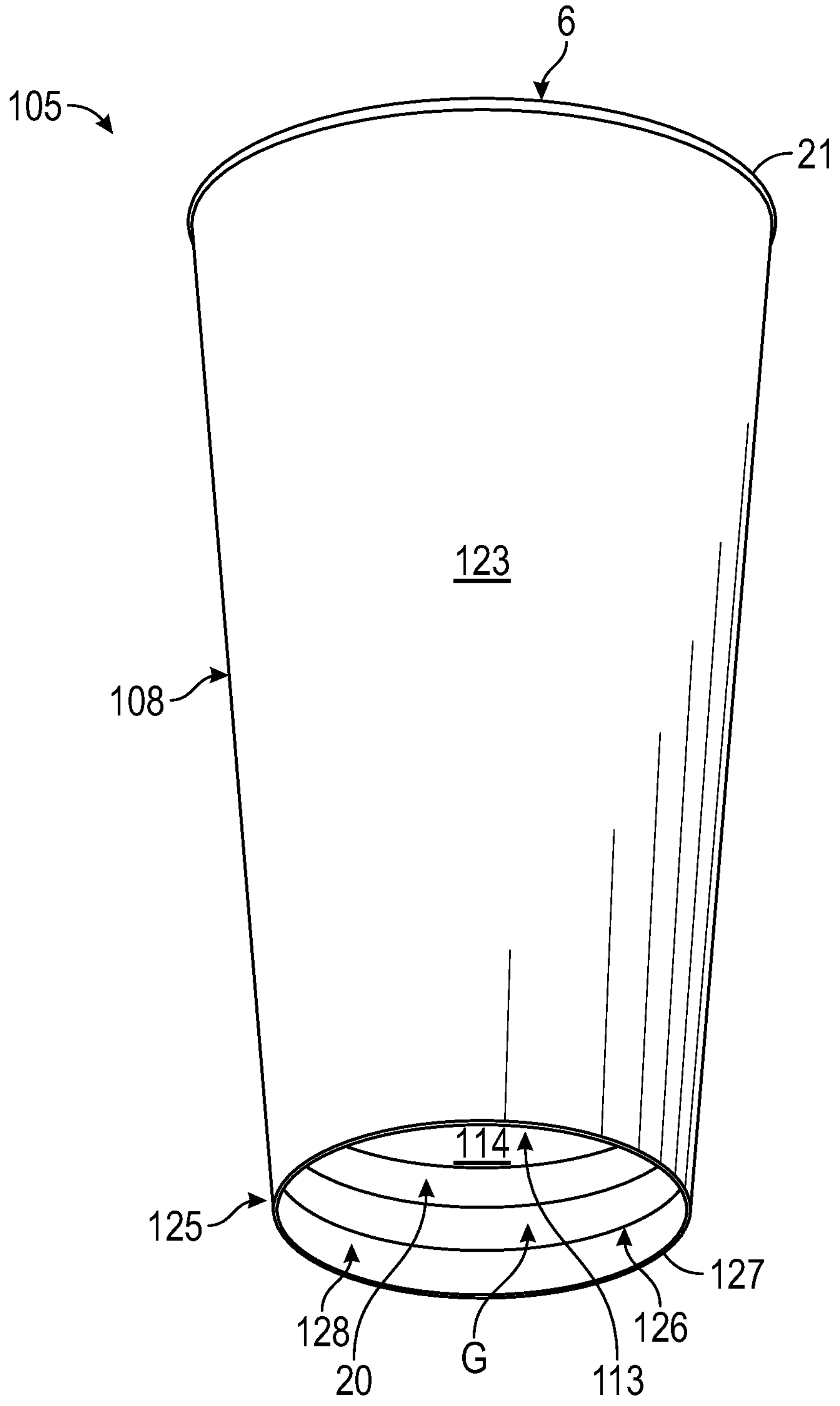
FIG. 5 is a perspective view of a container according to a second exemplary embodiment of the disclosure.
Figure 6:
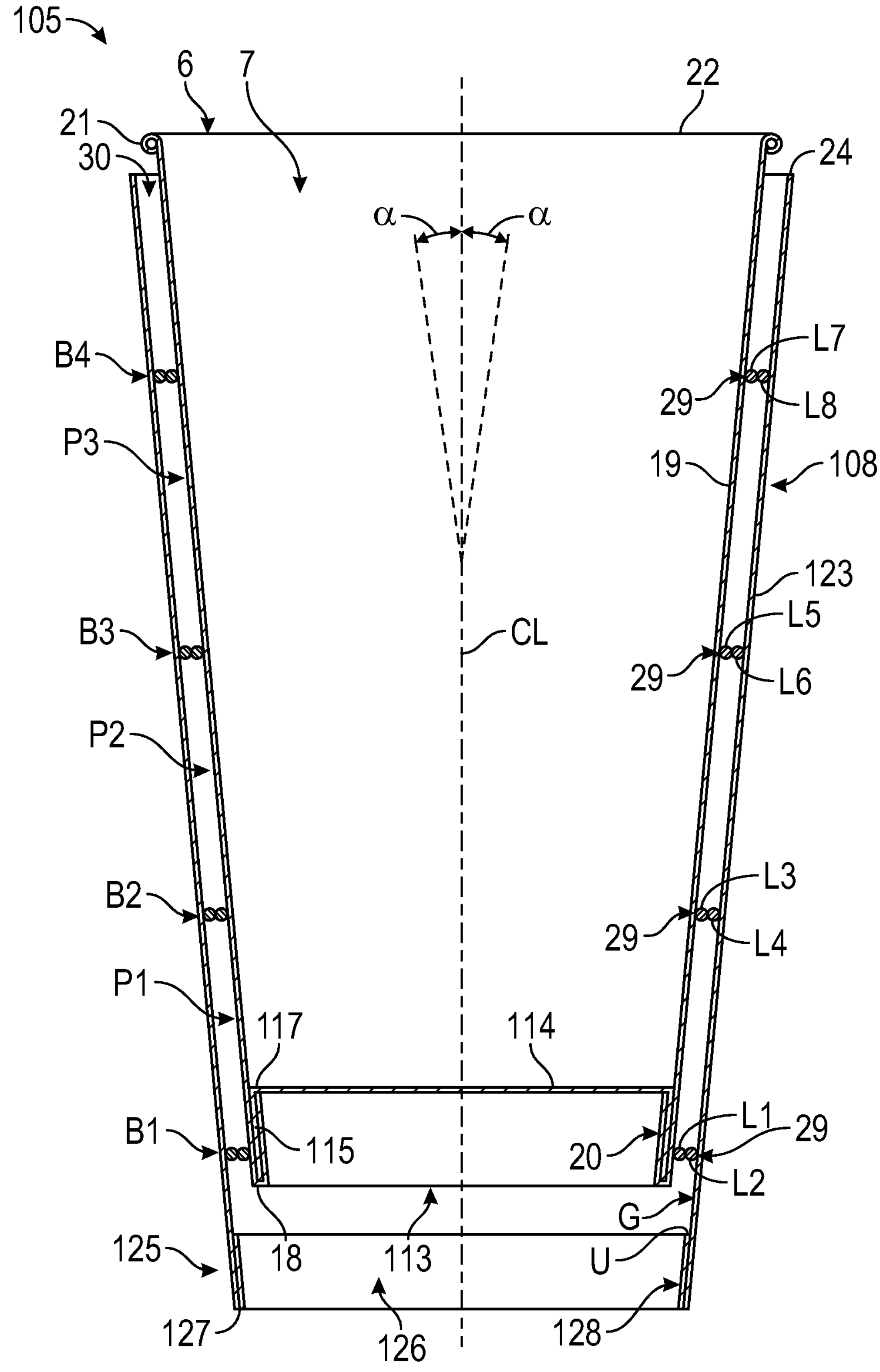
FIG. 6 is a schematic cross-sectional view of the container of FIG. 5.

Referring additionally to FIGS. 5 and 6, a container 105 is illustrated according to a second exemplary embodiment of the disclosure. It will be understood that the container 105 can be a modification of the container 5 of the first exemplary embodiment of the disclosure. One or more portions of the container 105 are substantially similar to that of the container 5 of the first exemplary embodiment of the disclosure, and like or similar reference numbers will refer to such like or similar elements.

As shown, the container 105 includes the sidewall construct 108, which includes the inner sidewall 19 and an outer sleeve 123. Insulating features are disposed between the inner sidewall 19 and the outer sleeve 123 of the container 105 as described above with respect to the container 5. For example, and as shown, bands B1, B2, B3, B4 of spacers 29 can be disposed between the inner sidewall 19 and the outer sleeve 23, and define the respective pockets P1, P2, P3 therebetween.

The outer sleeve 23 extends downwardly past the lower edge 18 of the inner sidewall 19 to form an annular base 125 of the container 105 such that a lower portion of the outer sleeve 23 defines an interior annular recess 126 between the lower edge 127 of the annular base 125/container 105 and a bottom panel 114.

A lower edge margin 128 of the sleeve 23, as shown, is interiorly folded into the annular recess 125 into face-to-face contact with a lower portion of the outer sleeve 123/annular base 125 to define the lower edge 127 and to provide a two-ply structure at a bottom portion of the annular base 125 upon which the container 105 can rest in an upright orientation.

As also shown, the closed bottom 113, including the bottom panel 114 and an annular leg 115 foldably connected thereto at a line of weakening 117, are positioned a vertical distance above the lower edge 127 of the container 105, and an annular discontinuity or annular gap G is defined between the lower edge 18 of the inner sidewall 19 and an upper edge U of the lower edge margin 128 of the sleeve 23. In one embodiment, the annular gap G can provide a vent for one or more portions of the cavity 30.

Figure 7A:
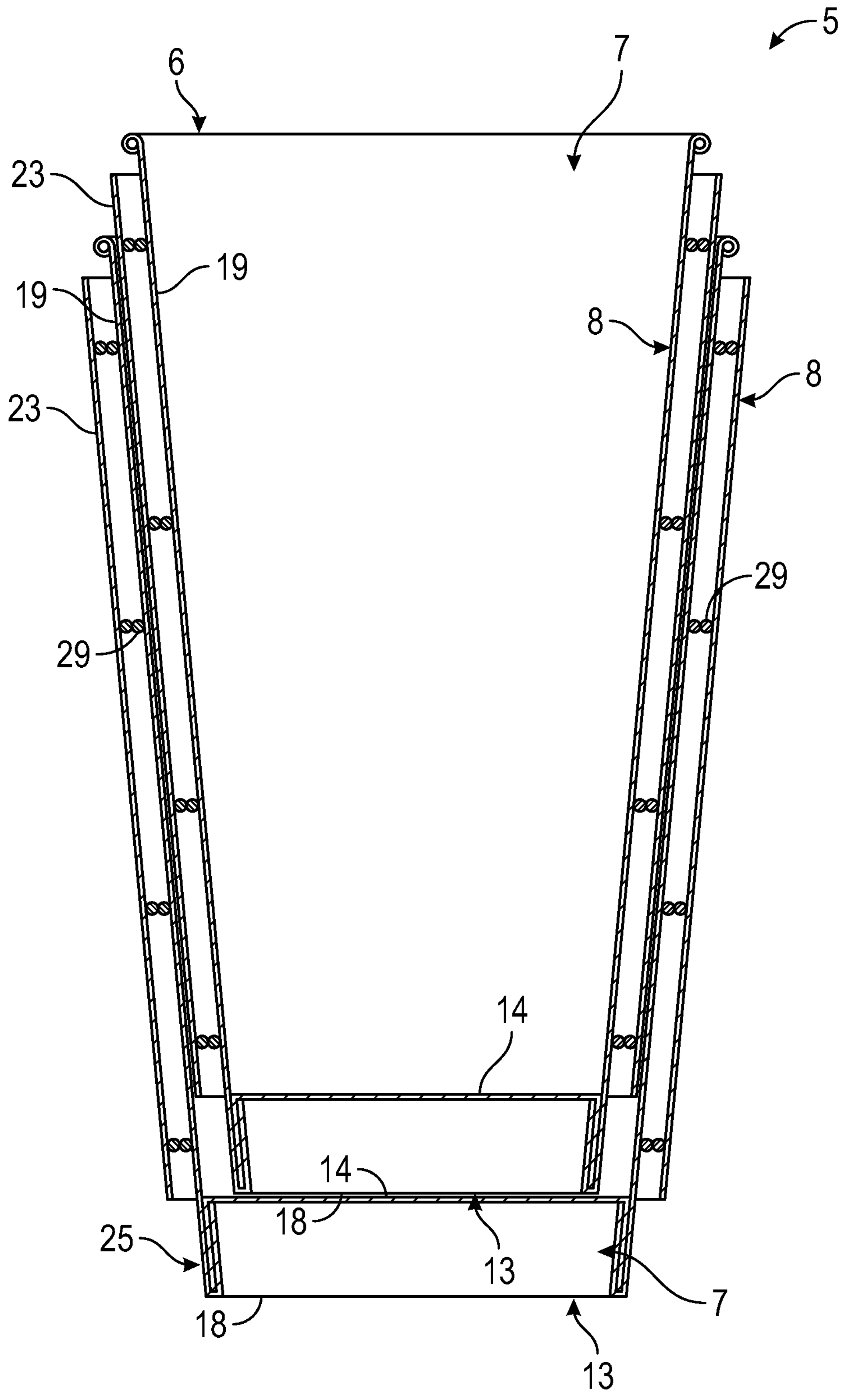
FIG. 7A is a schematic cross-sectional view of a pair of containers, each as shown in FIG. 1, in a nested arrangement.
Figure 7B:
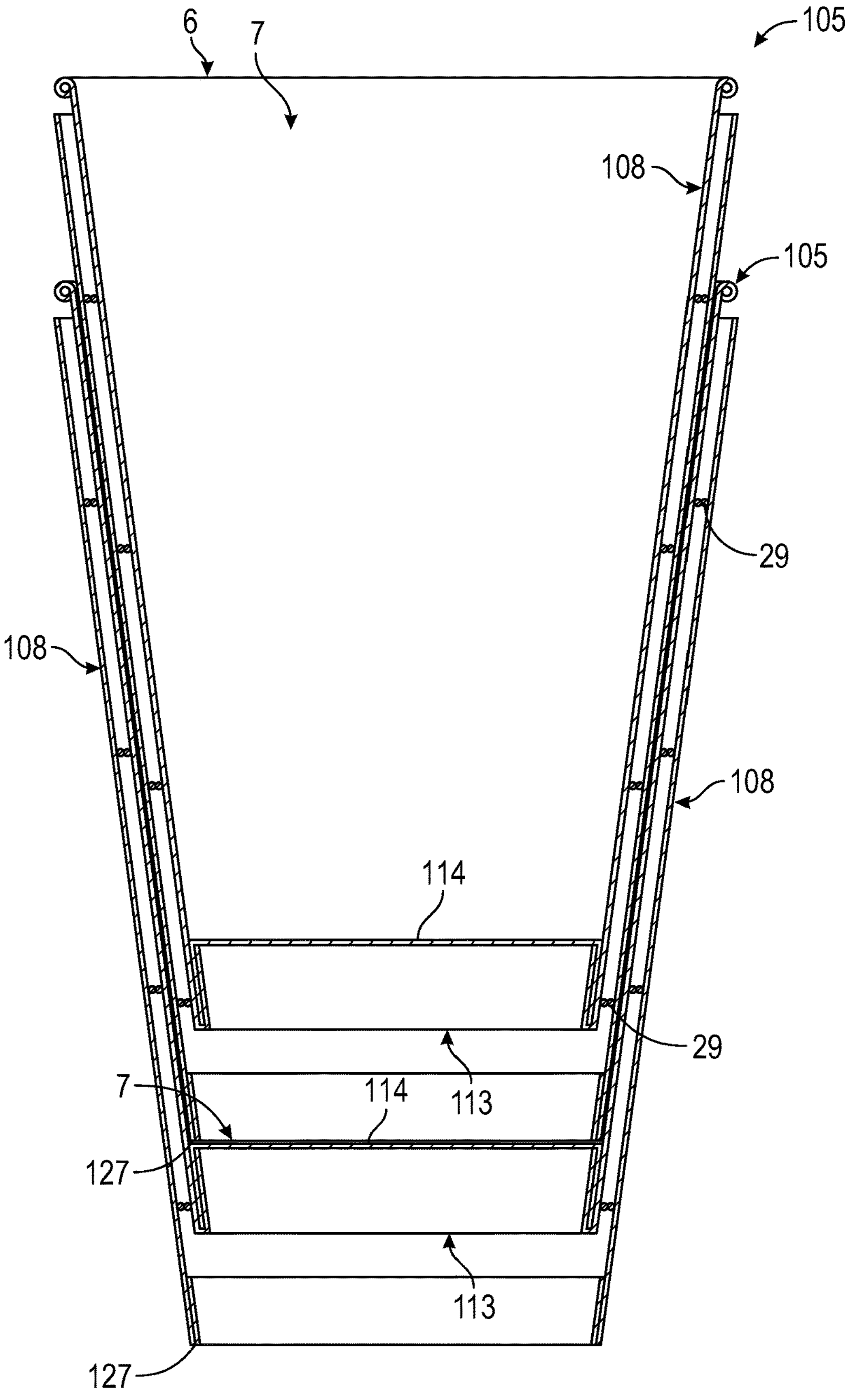
FIG. 7B is a schematic cross-sectional view of a pair of containers, each as shown in FIG. 6, in a nested arrangement.
Figure 7C:
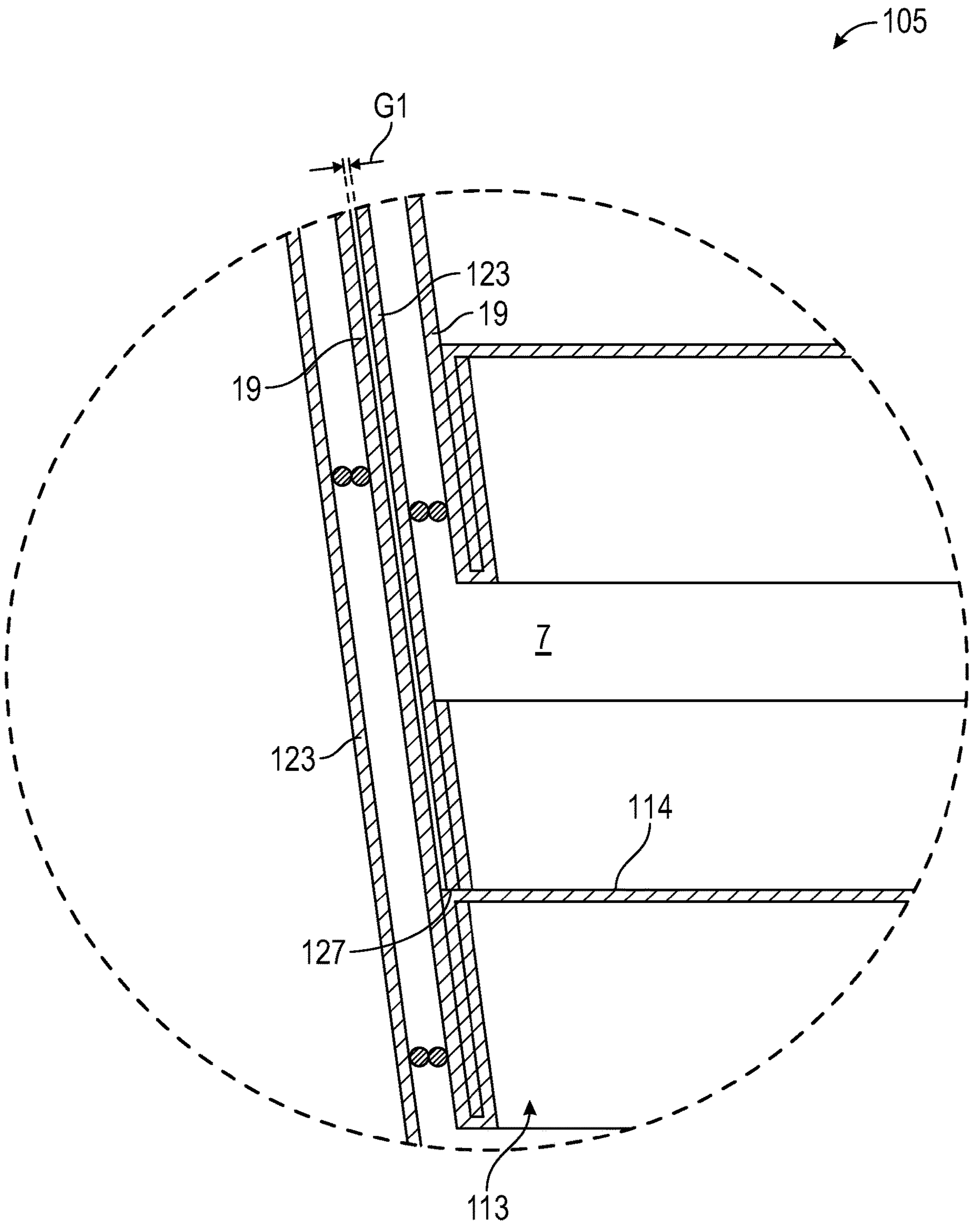
FIG. 7C is an enlarged portion of FIG. 7B.

In one embodiment, the inner sidewall 19 and the sleeve 123, with insulating features therebetween, can be separately formed from the closed bottom 113, and so that the bottom 113 can be coupled to the sidewall construct 8 to form the container 105. In this regard, the sidewall 108 can be produced as a structure that receives the bottom 113 so that the bottom 113 can be selectively coupled at different locations of the sidewall 8 to provide an interior space of the container 105 with a different selected interior volume. Such features are described in U.S. Provisional Patent Application No. 62/674,834, filed on May 22, 2018, the entire contents of which are incorporated by reference herein With additional reference to FIGS. 7A, 7B, 7C, the angle α of the sidewall construct 8 can be selected such that the lower edge 27, 127 of a respective upper container 5, 105 engages the respective bottom panel 14, 114 of a respective lower receiving container 5, 105 prior to substantial frictional engagement of the sidewall constructs 8 of the respective containers 5, 105 e.g., so that respective containers 5, 105 can be easily separated or otherwise de-nested from one another. As shown in the nested arrangement of FIG. 7C, the lower edge 127 of the upper container 105 is in contact with the bottom panel 114 of the lower container while an air gap G1 is maintained between the outer sleeve 123 of the inner container and the inner sidewall 19 of the lower container. The presence of the air gap G1 in the nested configuration prevents taper locking of the upper and lower containers 105 and allows easy separation of the upper and lower containers 105 from the nested configuration of FIGS. 7B and 7C. In one embodiment, the container 5 can include surface features to facilitate separation or de-nesting, for example, embossed and/or embossed surfaces. Such an arrangement of the containers 5, 105 can provide significant space savings for transport and/or storage of the containers 5, 105.

Referring additionally to FIGS. 8-10B, a container 205 is illustrated according to a third exemplary embodiment of the disclosure. It will be understood that the container 205 is similar to the container 105 of the second embodiment, except the container 205 includes a sidewall construct 208 with the bands B1, B2, B3, B4 of each spacer 29 between the inner sidewall 19 and the outer sleeve 123 comprising three layers of adhesive L10, L11, L12. One or more portions of the container 205 are substantially similar to that of the containers 5, 105 of the first and second exemplary embodiments of the disclosure, and like or similar reference numbers will refer to such like or similar elements.

Figure 8:
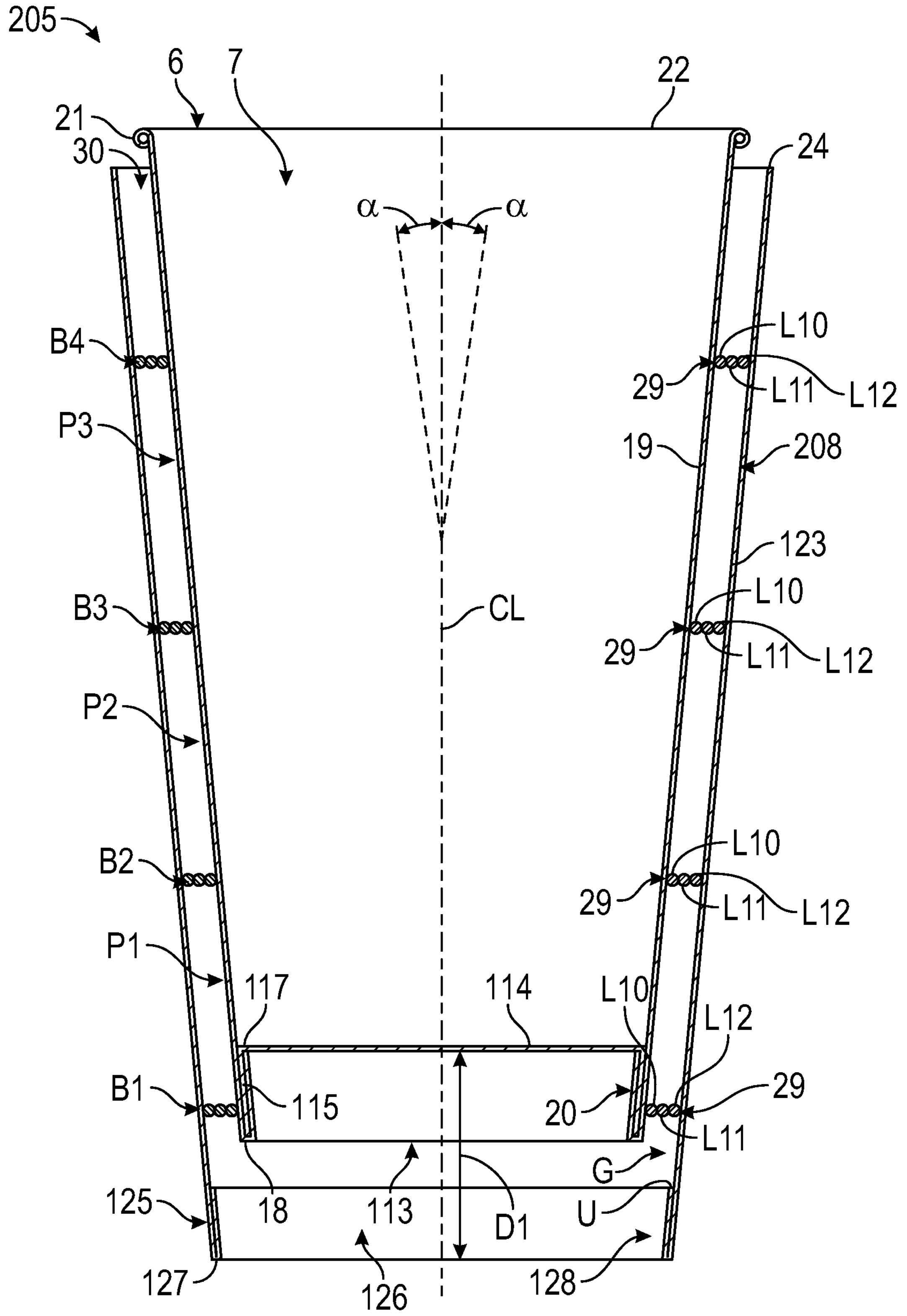
FIG. 8 is a schematic cross-sectional view of a container according to a third exemplary embodiment of the disclosure.
Figure 9:
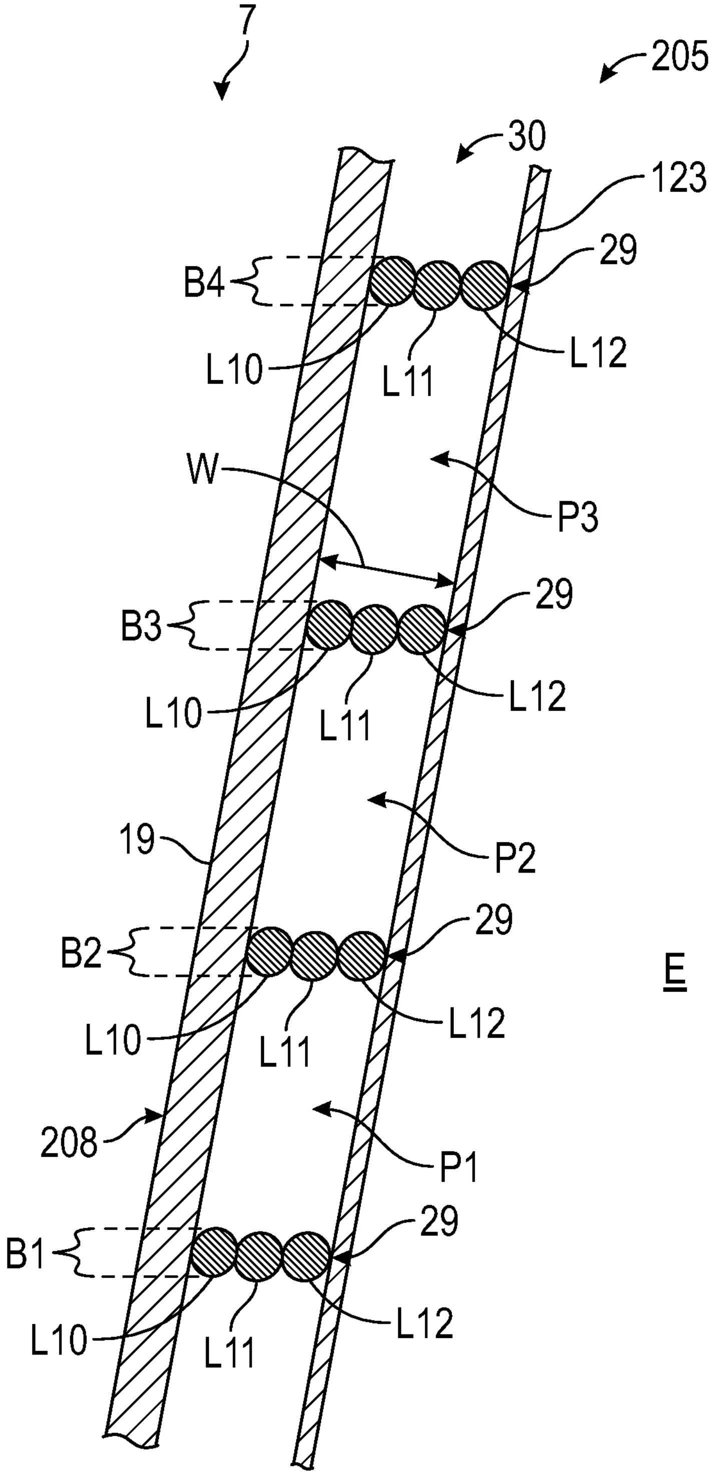
FIG. 9 is a schematic cross-sectional view of a portion of a sidewall construct of the container of FIG. 8.

In the embodiment of FIG. 8, the inner layer of adhesive L10 is in contact with the inner sidewall 19, the middle layer of adhesive L11 is adjacent and in contact with the inner layer of adhesive L10, and the outer layer of adhesive L12 is adjacent and in contact with the middle layer of adhesive L11 and the outer sleeve 123. The combined width of the three layers of adhesive L10, L11, L12 from the inner sidewall 19 to the outer sleeve 123 comprises the spacing or width W of the pockets P1, P2, P3 of the insulating features of the container 205. The insulating features and the container 205 could be otherwise shaped, arranged, and/or configured without departing from the disclosure.

The container 205 has a closed bottom 113 similar to the container 105 of the second embodiment. As with the second embodiment, the outer sleeve 123 extends downwardly past the lower edge 18 of the inner sidewall 19 to form an annular base 125 of the container 105 such that a lower portion of the outer sleeve 123 defines an interior annular recess 126 between the lower edge 127 of the annular base 125/container 105 and a bottom panel 114. A lower edge margin 128 of the sleeve 123, as shown, is interiorly folded into the annular recess 125 into face-to-face contact with a lower portion of the outer sleeve 123/annular base 125 to define the lower edge 127 and to provide a two-ply structure at a bottom portion of the annular base 125 upon which the container 105 can rest in an upright orientation. As also shown, the closed bottom 113, including the bottom panel 114 and an annular leg 115 foldably connected thereto at a line of weakening 117, are positioned a vertical distance above the lower edge 127 of the container 205, and an annular discontinuity or annular gap G is defined between the lower edge 18 of the inner sidewall 19 and an upper edge U of the lower edge margin 128 of the sleeve 123. In one embodiment, the annular gap G can provide a vent for one or more portions of the cavity 30. The closed bottom 113 could be otherwise shaped, arranged, and/or configured without departing from the disclosure.

In one embodiment, the inner sidewall 19 and the sleeve 223, with insulating features therebetween, can be separately formed from the closed bottom 113, and so that the bottom 113 can be coupled to the sidewall construct 208 to form the container 205. In this regard, the sidewall construct 208 can be produced as a structure that receives the bottom 113 so that the bottom 113 can be selectively coupled at different locations of the sidewall 8 to provide an interior space of the container 205 with a different selected interior volume. Such features are described in U.S. Provisional Patent Application No. 62/674,834, filed on May 22, 2018, and U.S. patent application Ser. No. 16/382,265 filed Apr. 12, 2019, the entire contents of which are incorporated by reference herein.

Figure 10:
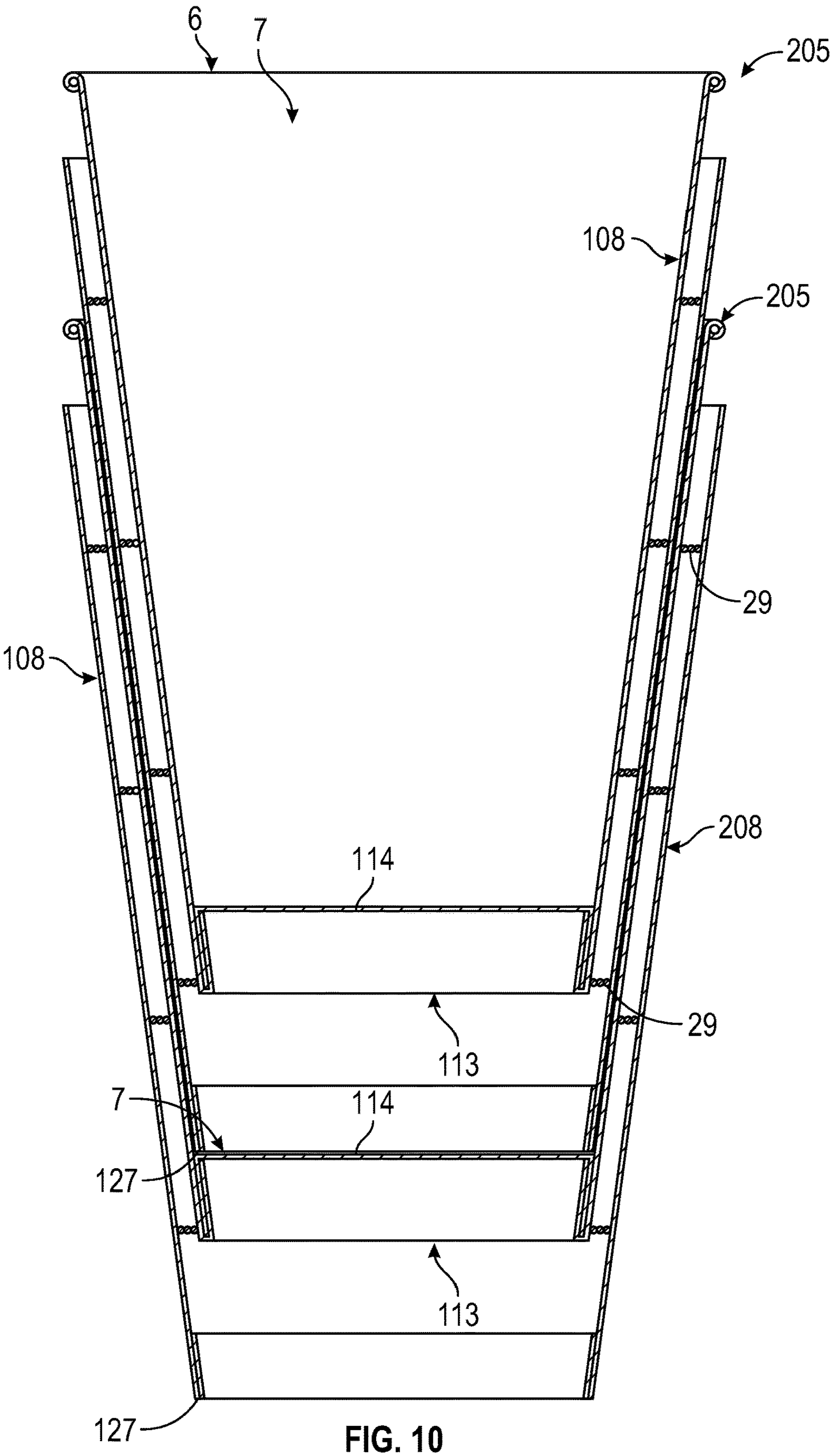
FIG. 10 is a schematic cross-sectional view of a pair of containers, each as shown in FIG. 8 in a nested arrangement.
Figure 10A:
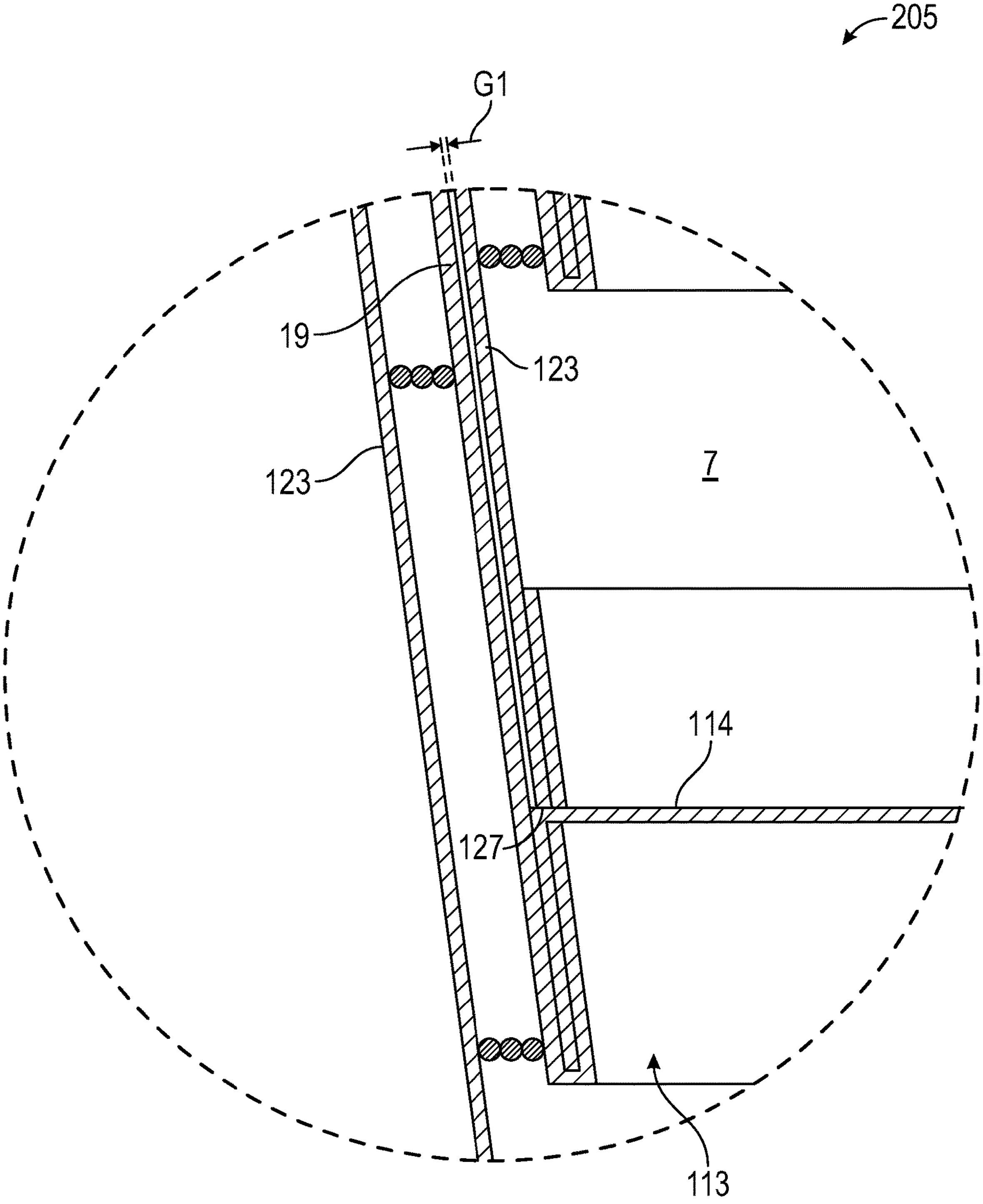
FIG. 10A is an enlarged portion of FIG. 10.
Figure 10B:
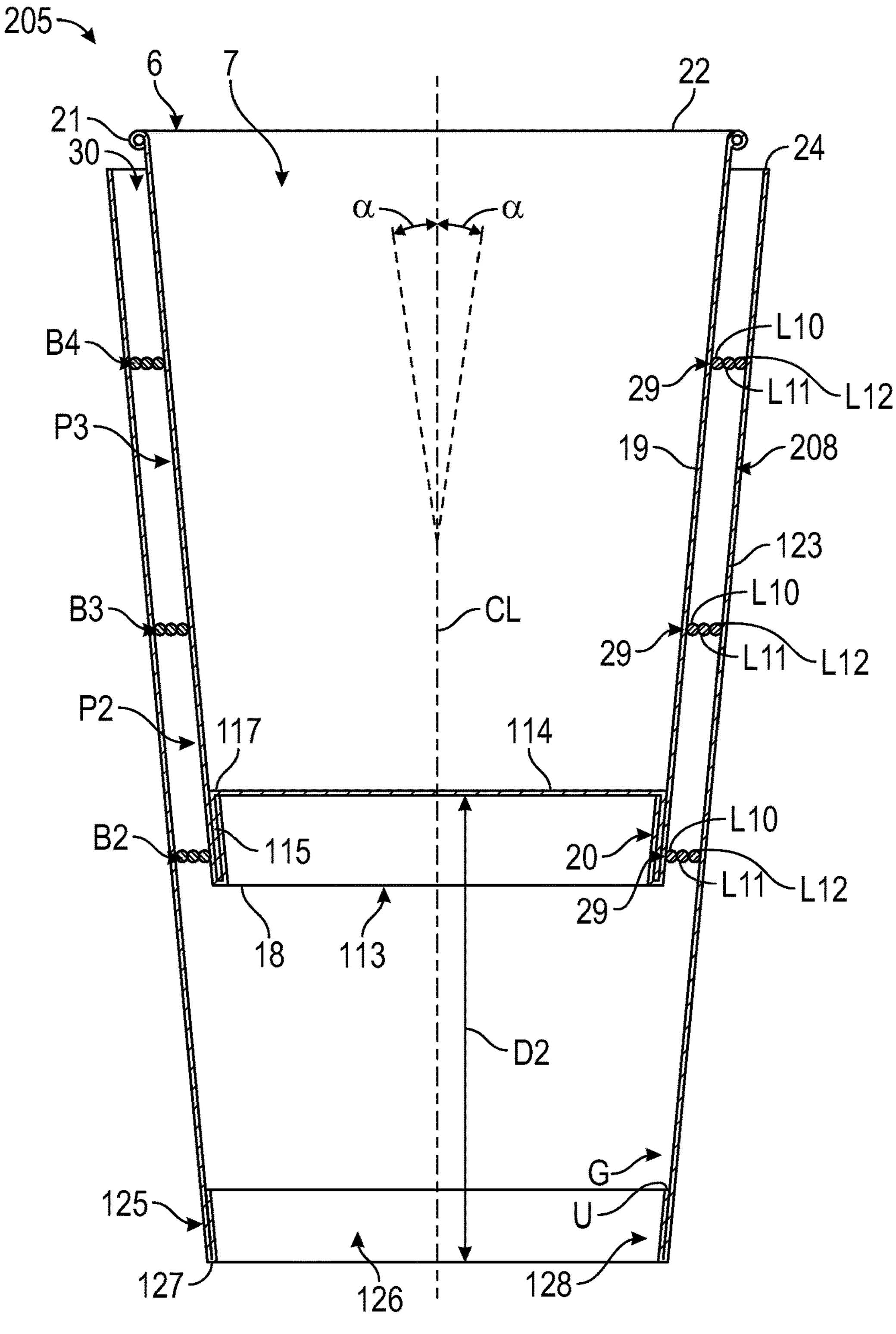
FIG. 10B is a view similar to FIG. 8 with a closed bottom of the container at an alternative position.

As shown in FIG. 8, the container 205 is shown with the bottom panel 114 of the closed bottom 113 positioned at a distance D1 from the lower edge 127 of the container. As shown in FIG. 10B, the container is illustrated with the bottom panel 114 of the closed bottom 113 in a raised positioned relative to FIG. 8, so that the bottom panel 114 is positioned at a distance D2 from the lower edge 127 of the container. In embodiment, D1 and D2 can be at least about ⅝ inch, or D1 and D2 can be in the range of at least about ⅝ inch to about 1.25 inches without departing from the disclosure. It will be understood that the closed bottom 113 can be positioned at any desired vertical location of the sidewall construct 208 having a constant angle $\alpha$ to provide an interior volume corresponding to a desired fluid size for the container 205. In this regard, at least the configuration and/or location of the bottom 113 of containers formed from the sidewall construct 208 allows for the interior volume of the containers to be selected by a user so as to provide the sidewall construct 208 and containers formed therefrom with scalable features.

As with the previous embodiments, the container 205 has features that allow for "bottom nesting". As shown in FIGS. 10 and 10A, the angle $\alpha$ of the sidewall construct 208 can be selected such that the lower edge 127 of a respective upper container 205 engages the respective bottom panel 114 of a respective lower receiving container 205 prior to substantial frictional engagement of the sidewall constructs 208 of the respective containers 205, so that respective containers 205 can be easily separated or otherwise de-nested from one another. As shown in the nested arrangement of FIGS. 10 and 10A, the lower edge 127 of the upper container 205 is in contact with the bottom panel 114 of the lower container while an air gap G1 is maintained between the outer sleeve 123 of the inner container and the inner sidewall 19 of the lower container. The presence of the air gap G1 in the nested configuration prevents taper locking of the upper and lower containers 205 and allows easy separation of the upper and lower containers 205 from the nested configuration of FIGS. 10 and 10A. In one embodiment, the container 205 can include surface features to facilitate separation or de-nesting, for example, embossed and/or embossed surfaces. Such an arrangement of the containers 205 can provide significant space savings for transport and/or storage of the containers 205. In one embodiment, the angle $\alpha$ can be approximately 7.3 degrees, or the angle $\alpha$ could be in the range of about 2 degrees to about 10 degrees.

Referring additionally to FIGS. 11-13B, a container 305 is illustrated according to a fourth exemplary embodiment of the disclosure. It will be understood that the container 305 is similar to the container 205 of the third embodiment, except the container 305 includes a sidewall construct 308 with the bands B1, B2, B3, B4 of each spacer 29 between the inner sidewall 19 and the outer sleeve 123 comprising four layers of adhesive L13, L14, L15, L16. One or more portions of the container 305 are substantially similar to that of the containers 5, 105, 205 of the first, second, and third exemplary embodiments of the disclosure, and like or similar reference numbers will refer to such like or similar elements.

Figure 11:
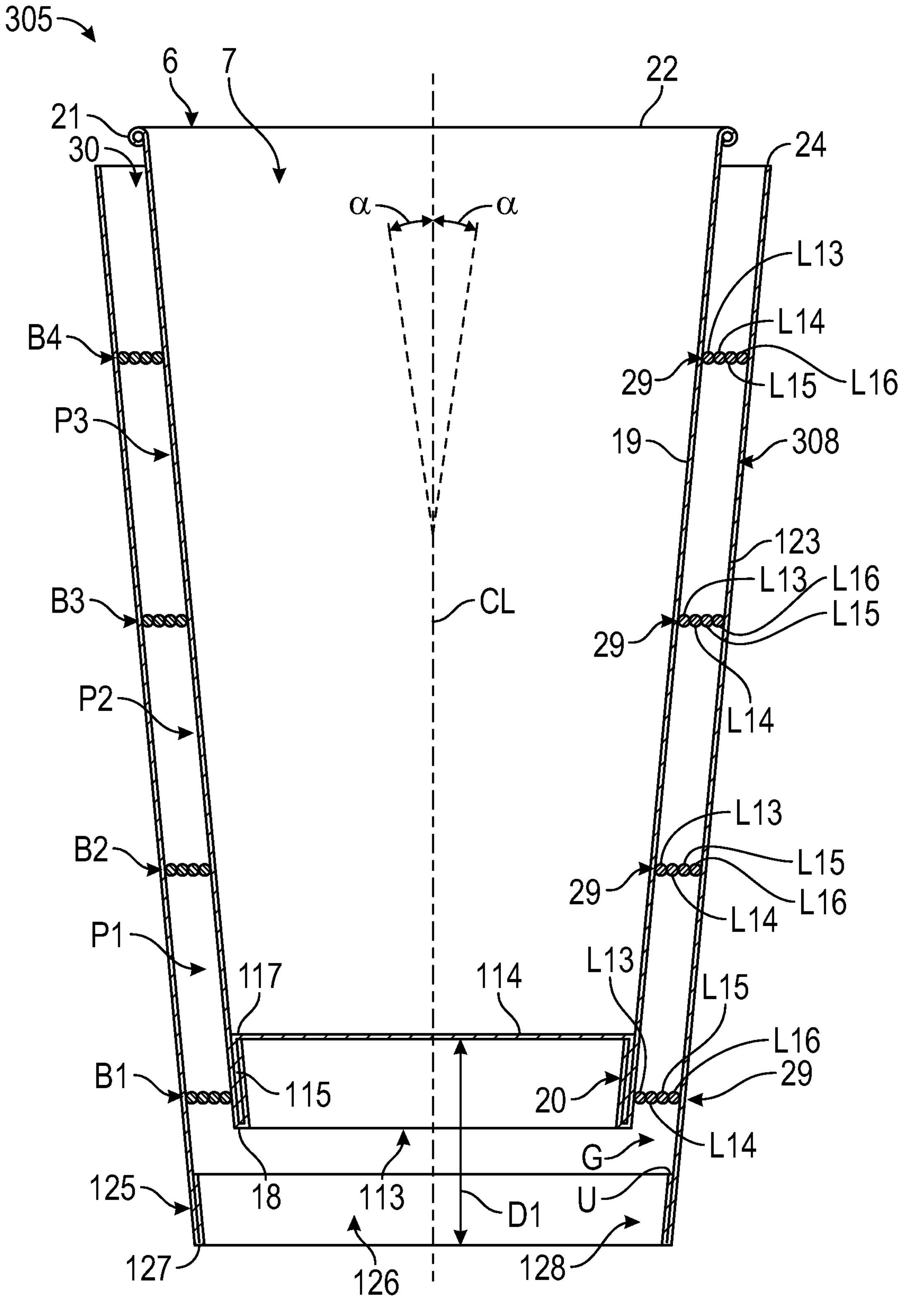
FIG. 11 is a schematic cross-sectional view of a container according to a fourth exemplary embodiment of the disclosure.
Figure 12:
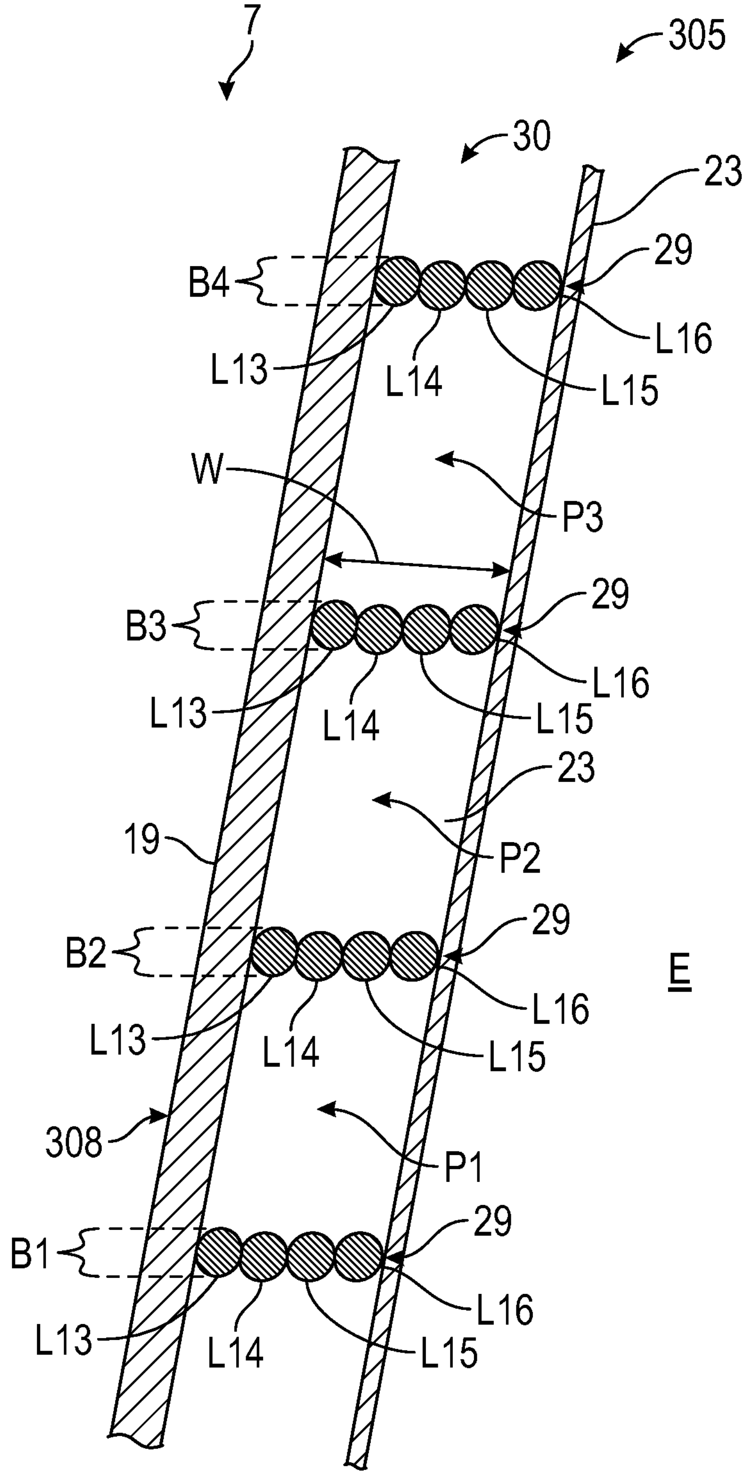
FIG. 12 is a schematic cross-sectional view of a portion of a sidewall construct of the container of FIG. 11.

In the embodiment of FIG. 11, the inner layer of adhesive L13 is in contact with the inner sidewall 19, the first middle layer of adhesive L14 is adjacent and in contact with the inner layer of adhesive L13, the second middle layer L15 of adhesive is adjacent and in contact with the first middle layer of adhesive L14, and the outer layer of adhesive L16 is adjacent and in contact with the second middle layer of adhesive L15 and the outer sleeve 123. The combined width of the four layers of adhesive L13, L14, L15, L16 from the inner sidewall 19 to the outer sleeve 123 comprises the spacing or width W of the pockets P1, P2, P3 of the insulating features of the container 305. The insulating features and the container 305 could be otherwise shaped, arranged, and/or configured without departing from the disclosure.

The container 305 includes a similar closed bottom 113 as the container 205 in that the container 305 is also scalable with the bottom panel 113 positionable at various distances D1, D2 from the lower edge 127 of the container 305. The container 305 could have other bottom features without departing from the disclosure.

Figure 13:
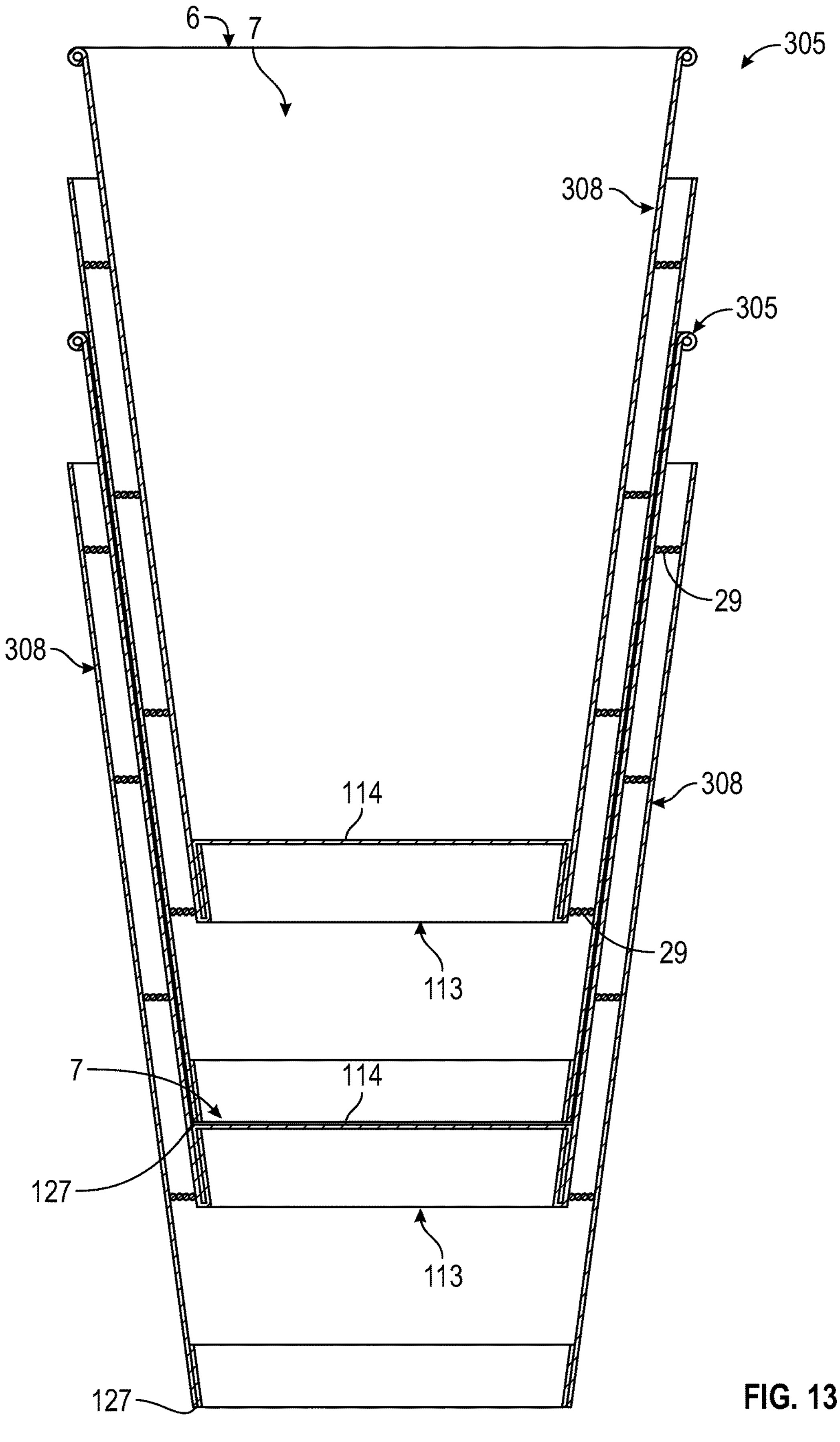
FIG. 13 is a schematic cross-sectional view of a pair of containers, each as shown in FIG. 11 in a nested arrangement.
Figure 13A:
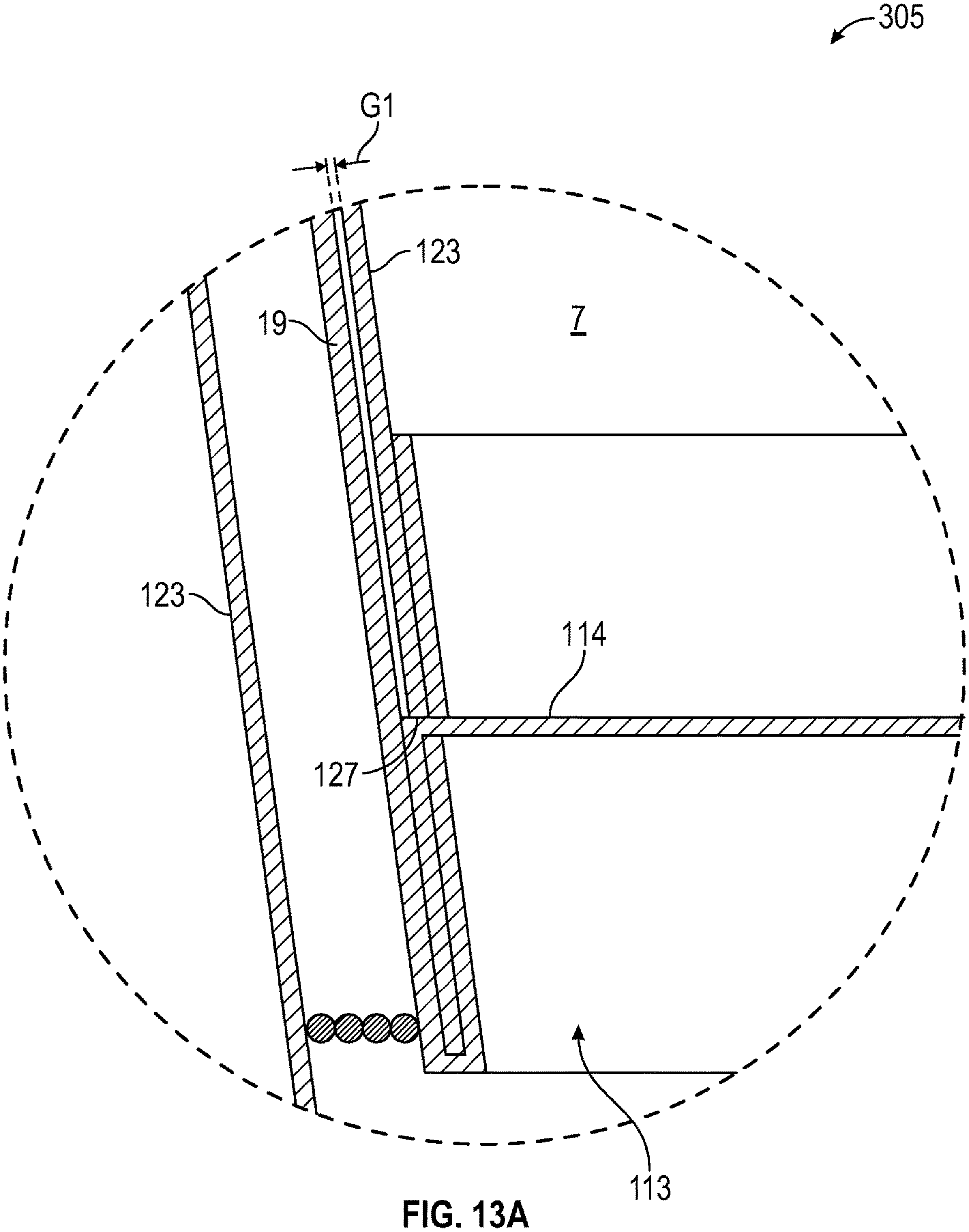
FIG. 13A is an enlarged portion of FIG. 13.
Figure 13B:
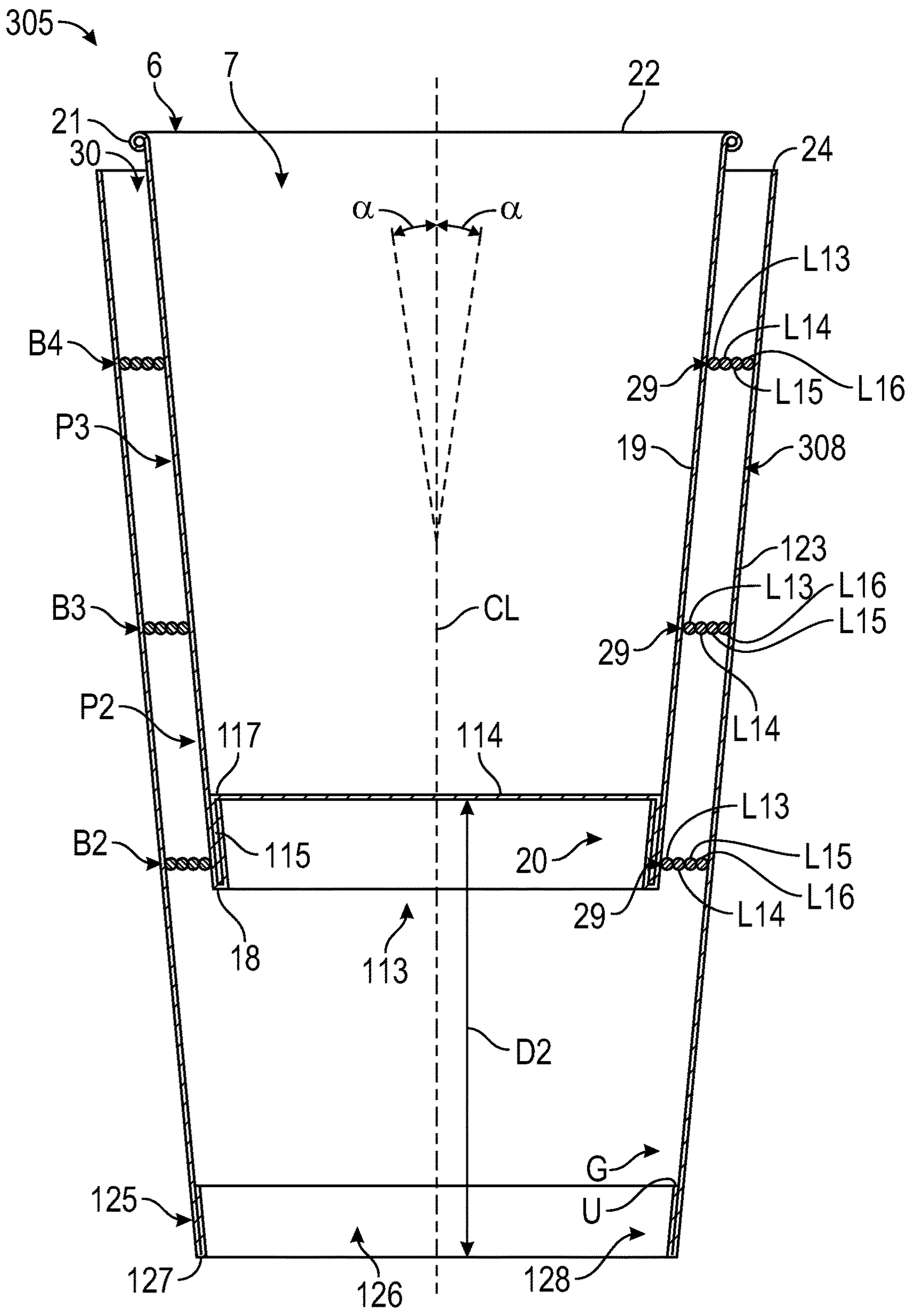
FIG. 13B is a view similar to FIG. 11 with a closed bottom of the container at an alternative position.

As shown in FIGS. 13, and 13A, the container 305 has features that allow for "bottom nesting" in a similar manner as the containers 105, 205, with the angle $\alpha$ of the sidewall construct 308 being selected such that the lower edge 127 of a respective upper container 305 engages the respective bottom panel 114 of a respective lower receiving container 305 prior to substantial frictional engagement of the sidewall constructs 308 of the respective containers 305, so that respective containers 305 can be easily separated or otherwise de-nested from one another. As shown in the nested arrangement of FIGS. 13 and 13A, the lower edge 127 of the upper container 305 is in contact with the bottom panel 114 of the lower container while an air gap G1 is maintained between the outer sleeve 123 of the inner container and the inner sidewall 19 of the lower container. The presence of the air gap G1 in the nested configuration prevents taper locking of the upper and lower containers 305 and allows easy separation of the upper and lower containers 305 from the nested configuration of FIGS. 13 and 13A. In one embodiment, the container 305 can include surface features to facilitate separation or de-nesting, for example, embossed and/or embossed surfaces. Such an arrangement of the containers 305 can provide significant space savings for transport and/or storage of the containers 305. In one embodiment, the angle $\alpha$ can be approximately 7.3 degrees, or the angle $\alpha$ could be in the range of about 2 degrees to 10 degrees.

The containers 5, 105, 205, 305 can have various dimensions and features that allow for enhanced insulating features as well as bottom nesting of the closed bottom in a stacked arrangement of the containers (FIGS. 7A, 7B, 7C, 10, 10A, 13, 13A). For example, the insulating features such as the pockets P1, P2, P3, P4 can have a width W in the range of between about 60 mils and about 120 mils, for example, about 60 mils, about 70 mils, about 80 mils, about 90 mils, about 100 mils, about 110 mils, about 120 mils, etc. or integer or non-integer numbers therebetween. In one embodiment, the width W can be about 80 mils. In one embodiment, the angle α can be in the range of about 2 degrees to about 10 degrees, for example about 7 degrees, about 7.3 degrees, or any angle therebetween. The bottom panel 114 of the closed bottom 113 can be spaced from the lower edge 127 of the container a distance D1, D2 in the range of about 0.625 inches to about 1.25 inches. In one embodiment, the distance D1, D2 is approximately 0.9 inches. The containers 5, 105, 205, 305 can have other dimensions than listed herein, as the dimensions herein are exemplary of suitable embodiments of containers having insulating features and bottom nesting features.

The containers and/or the blanks that form the containers according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blank. In accordance with the above-described embodiments, the blanks may be constructed of paperboard of a caliper such that it is heavier and more rigid than ordinary paper. The blanks can also be constructed of other materials, such as cardboard, hard paper, or any other material having properties suitable for enabling the container to function at least generally as described herein. The blanks can also be laminated or coated with one or more sheet-like materials at selected panels or panel sections.

The above embodiments may be described as having one or more portions adhered together by glue during erection of the container embodiments. The term "glue" is intended to encompass all manner of adhesives commonly used to secure containers in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A container for containing a cold fluid, comprising:

a sidewall construct comprising an inner sidewall extending at least partially around an interior of the container, an outer sleeve attached to the inner sidewall, and a cavity defined between the inner sidewall and the outer sleeve; and a closed bottom defining a bottom of the interior of the container, the container comprises insulating features comprising the cavity and a plurality of annular bands, each annular band of the plurality of annular bands comprises a spacer that extends in the cavity from the inner sidewall to the outer sleeve, the spacer comprises at least a first layer of material applied to a second layer of material adjacent the first layer of material, and adjacent bands define a respective pocket of a plurality of pockets in the cavity such that the insulating features maintain a desired temperature of the cold fluid.

2. The container of claim 1, wherein the first layer of material and the second layer of material are comprised of adhesive.

3. The container of claim 1, wherein the spacer has a width between about 60 mils and about 120 mils.

4. The container of claim 1, wherein the spacer has a width between about 80 mils and about 120 mils.

5. The container of claim 1, wherein the spacer has a width of about 80 mils.

6. The container of claim 1, wherein the spacer comprises a third layer of material adjacent the second layer of material.

7. The container of claim 6, wherein the first layer of material is in contact with the inner sidewall and the third layer of material is in contact with the outer sleeve.

8. The container of claim 6, wherein the closed bottom is spaced above the lower edge of the outer sleeve by a distance of least about ⅝ inch and the spacer has a width of about 80 mils.

9. The container of claim 6, wherein the spacer comprises a fourth layer of material adjacent the third layer of material.

10. The container of claim 9, wherein the first layer of material is in contact with the inner sidewall and the fourth layer of material is in contact with the outer sleeve.

11. The container of claim 9, wherein the closed bottom is spaced above the lower edge of the outer sleeve by a distance of least about ⅝ inch and the spacer has a width of about 80 mils.

12. The container of claim 1, wherein the spacer comprises a substantially continuous length of material that circumscribes the inner sidewall.

13. The container of claim 1, wherein the closed bottom is spaced above a lower edge of the outer sleeve such that a lower portion of the outer sleeve defines an annular recess below the closed bottom.

14. The container of claim 1, wherein the closed bottom is spaced above the lower edge of the outer sleeve by a distance of at least about ⅝ inch and the spacer has a width of about 80 mils.

15. The container of claim 13, wherein the closed bottom comprises a bottom panel and an annular leg extending downwardly from the bottom panel and attached to the inner sidewall, the annular leg is spaced above the lower edge of the outer sleeve.

16. The container of claim 15, wherein the closed bottom is selectively positioned at the first vertical distance from the outer lower edge or at the second vertical distance from the outer lower edge such that an interior volume of the container is scalable based on the selected position of the closed bottom.

17. The container of claim 16, wherein the container has a first interior volume when the closed bottom is at the first vertical distance and the container has a second interior volume when the closed bottom is at the second vertical distance, the first vertical distance is less than the second vertical distance such that the first interior volume is greater than the second interior volume.

18. The container of claim 17, wherein the sidewall construct is oriented at a constant angle relative to a vertical centerline of the container when the closed bottom is positioned at the first vertical distance and at the second vertical distance.

19. A sidewall construct for forming a fluid container for containing a cold fluid, the sidewall construct comprising:

an inner sidewall extending at least partially around an interior of the container;

an outer sleeve attached to the inner sidewall;

a cavity defined between the inner sidewall and the outer sleeve; and insulating features comprising the cavity and a plurality of annular bands, each annular band of the plurality of annular bands comprises a spacer that extends in the cavity from the inner sidewall to the outer sleeve, the spacer comprises at least a first layer of material applied to a second layer of material adjacent the first layer of material, and adjacent bands define a respective pocket of a plurality of pockets in the cavity for maintaining a desired temperature of the cold fluid.

20. The sidewall construct of claim 19, wherein the first layer of material and the second layer of material are comprised of adhesive.

21. The sidewall construct of claim 19, wherein the spacer has a width between about 60 mils and about 120 mils.

22. The sidewall construct of claim 19, wherein the spacer has a width between about 80 mils and about 120 mils.

23. The sidewall construct of claim 19, wherein the spacer has a width of about 80 mils.

24. The sidewall construct of claim 19, wherein the spacer comprises a third layer of material adjacent the second layer of material.

25. The sidewall construct of claim 24, wherein the first layer of material is in contact with the inner sidewall and the third layer of material is in contact with the outer sleeve.

26. The sidewall construct of claim 24, wherein the spacer comprises a fourth layer of material adjacent the third layer of material.

27. The sidewall construct of claim 26, wherein the first layer of material is in contact with the inner sidewall and the fourth layer of material is in contact with the outer sleeve.

28. A method of forming a container for containing a cold fluid, comprising;

obtaining an inner sidewall and an outer sleeve;

attaching the outer sleeve to the inner sidewall to form a sidewall construct with a cavity defined between the inner sidewall and the outer sleeve, the attaching comprises forming insulating features in the sidewall construct, the insulating features comprise the cavity and a plurality of annular bands, each annular band of the plurality of annular bands comprises a spacer that extends in the cavity from the inner sidewall to the outer sleeve, the spacer comprises at least a first layer of material applied to a second layer of material adjacent the first layer of material, adjacent bands define a respective pocket of a plurality of pockets in the cavity for maintaining a desired temperature of the cold fluid;

forming an interior of the container by positioning the sidewall construct so that the inner sidewall extends at least partially around the interior; and positioning a closed bottom relative to the sidewall construct.

29. The method of claim 28, wherein the first layer of material and the second layer of material are comprised of adhesive.

30. The method of claim 28, wherein the spacer has a width between about 60 mils and about 120 mils.

31. The method of claim 28, wherein the spacer has a width between about 80 mils and about 120 mils.

32. The method of claim 28, wherein the spacer has a width of about 80 mils.

33. The method of claim 28, wherein the spacer comprises a third layer of material adjacent the second layer of material.

34. The method of claim 33, wherein the forming the insulating layer comprises placing the first layer of material in contact with the inner sidewall and placing the outer sleeve in contact with the third layer of material.

35. The method of claim 33, wherein the spacer comprises a fourth layer of material adjacent the third layer of material.

36. The method of claim 35, wherein the forming the first layer of material comprises placing the first layer of material in contact with the inner sidewall and placing the outer sleeve in contact with the fourth layer of material.

37. The method of claim 28, wherein the positioning the closed bottom comprises spacing the closed bottom above a lower edge of the outer sleeve such that a lower portion of the outer sleeve defines an annular recess below the closed bottom.

38. The method of claim 37, wherein the closed bottom is spaced above the lower edge of the outer sleeve by a distance of least about ⅝ inch and the spacer has a width of about 80 mils.

39. The method of claim 37, wherein the closed bottom comprises a bottom panel and an annular leg extending downwardly from the bottom panel and attached to the inner sidewall, the annular leg is spaced above the lower edge of the outer sleeve.

40. The method of claim 39, wherein the closed bottom is selectively positioned at the first vertical distance from the outer lower edge or at the second vertical distance from the outer lower edge such that an interior volume of the container is scalable based on the selected position of the closed bottom.

41. The method of claim 40, wherein the container has a first interior volume when the closed bottom is at the first vertical distance and the container has a second interior volume when the closed bottom is at the second vertical distance, the first vertical distance is less than the second vertical distance such that the first interior volume is greater than the second interior volume.

42. The method of claim 41, wherein the sidewall construct is oriented at a constant angle relative to a vertical centerline of the container when the closed bottom is positioned at the first vertical distance and at the second vertical distance.

* * * * *